United States Patent
Barajas Gonzalez et al.

(10) Patent No.: US 9,666,223 B2
(45) Date of Patent: May 30, 2017

(54) ENHANCED TAPE LIBRARY CATALOGING

(71) Applicant: International Business Machines Corporation, Armonk, NY (US)

(72) Inventors: Emmanuel Barajas Gonzalez, Guadalajara (MX); Shawn M. Bramblett, Vail, AZ (US); Shaun E. Harrington, Sahuarita, AZ (US); Benjamin K. Rawlins, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/874,338

(22) Filed: Oct. 2, 2015

(65) Prior Publication Data

US 2017/0098462 A1 Apr. 6, 2017

(51) Int. Cl.
| | | |
|---|---|---|
| *G11B 15/68* | (2006.01) | |
| *G06K 7/10* | (2006.01) | |
| *G06K 19/077* | (2006.01) | |
| *G06K 19/04* | (2006.01) | |
| *E05B 73/00* | (2006.01) | |

(52) U.S. Cl.
CPC ........ *G11B 15/682* (2013.01); *G06K 7/10336* (2013.01); *G06K 19/07777* (2013.01); *E05B 73/0017* (2013.01); *G06K 19/045* (2013.01)

(58) Field of Classification Search
CPC .............. E05B 73/0017; G06K 19/045; G06K 19/0723; G06K 19/0776; G06K 19/07777; G06K 7/10336; G08B 13/2402; G08B 13/2417; G08B 21/0275; G11B 15/682
See application file for complete search history.

(56) References Cited

U.S. PATENT DOCUMENTS

| | | | |
|---|---|---|---|
| 6,100,788 A | 8/2000 | Frary | |
| 6,201,474 B1 * | 3/2001 | Brady | G06K 19/077 235/381 |
| 6,356,803 B1 * | 3/2002 | Goodman | G11B 15/6835 700/214 |
| 6,663,003 B2 * | 12/2003 | Johnson | G11B 15/07 235/375 |
| 6,710,962 B1 | 3/2004 | Caverly et al. | |
| 7,472,405 B2 * | 12/2008 | Pierce | G11B 15/6835 369/30.43 |

(Continued)

OTHER PUBLICATIONS

Wikipedia, "Near Field Communication," last accessed Sep. 19, 2015, https://en.wikipedia.org/wiki/Near_field_communication, 14 pages.

*Primary Examiner* — Brian Miller
(74) *Attorney, Agent, or Firm* — Zilka-Kotab, P.C.

(57) ABSTRACT

A tape-based data storage system, according to one embodiment, includes: a tape library having: a plurality cells, each of the cells being configured to store one or more tape cartridges therein, and at least an antenna of a near field communication reader positioned at each of the cells. Moreover, each of the antennas are positioned relative the associated cell to be in direct communication with a near field communication tag coupled to a tape cartridge stored in the associated cell. Other systems, methods, and computer program products are described in additional embodiments.

24 Claims, 15 Drawing Sheets

(56) References Cited

U.S. PATENT DOCUMENTS

| | | | | |
|---|---|---|---|---|
| 7,475,205 B2* | 1/2009 | McIntosh | G11B 27/002 | |
| | | | 710/13 | |
| 7,483,236 B2* | 1/2009 | McIntosh | G11B 15/6835 | |
| | | | 360/92.1 | |
| 7,535,669 B2* | 5/2009 | Goodman | G11B 15/6885 | |
| | | | 360/92.1 | |
| 7,588,185 B2* | 9/2009 | Berquist | G07G 1/0045 | |
| | | | 235/383 | |
| 7,660,812 B2* | 2/2010 | Findlay | G06Q 10/087 | |
| | | | 707/999.102 | |
| 7,694,884 B2* | 4/2010 | Georgis | G11B 17/22 | |
| | | | 235/462.01 | |
| 7,893,841 B2* | 2/2011 | Goodman | G11B 15/6835 | |
| | | | 340/572.1 | |
| 8,009,058 B2* | 8/2011 | Lehmann | G11B 15/689 | |
| | | | 235/385 | |
| 8,166,240 B2* | 4/2012 | McIntosh | G11B 27/002 | |
| | | | 340/10.1 | |
| 8,230,235 B2* | 7/2012 | Goodman | G06F 21/6218 | |
| | | | 713/193 | |
| 8,731,710 B2* | 5/2014 | Inagaki | G11B 15/6835 | |
| | | | 700/213 | |
| 8,738,474 B1* | 5/2014 | McHugh | G06Q 10/087 | |
| | | | 235/383 | |
| 8,768,789 B2* | 7/2014 | Smith | G07F 11/54 | |
| | | | 705/22 | |
| 8,953,423 B2 | 2/2015 | Chiba et al. | | |
| 9,174,800 B1* | 11/2015 | Curlander | B65G 1/02 | |
| 9,183,532 B2* | 11/2015 | Hauser | G06Q 10/087 | |
| 9,262,435 B2* | 2/2016 | Vibhor | H04L 29/0854 | |
| 2003/0090829 A1* | 5/2003 | Johnson | G11B 15/07 | |
| | | | 360/69 | |
| 2007/0162180 A1* | 7/2007 | Goodman | G11B 15/689 | |
| | | | 700/225 | |
| 2008/0230615 A1* | 9/2008 | Read | G06K 19/0719 | |
| | | | 235/492 | |
| 2009/0259678 A1* | 10/2009 | Valencia | H04L 12/2812 | |
| 2010/0157766 A1* | 6/2010 | Gregg | G06F 11/008 | |
| | | | 369/53.41 | |
| 2011/0270439 A1* | 11/2011 | Cabrero Gomez | B65G 1/04 | |
| | | | 700/218 | |
| 2014/0188262 A1* | 7/2014 | Koch | G01S 5/0289 | |
| | | | 700/112 | |
| 2015/0193173 A1* | 7/2015 | Bates | G06F 3/0686 | |
| | | | 711/112 | |
| 2015/0296085 A1* | 10/2015 | Peeler | H04M 3/568 | |
| | | | 381/77 | |

* cited by examiner

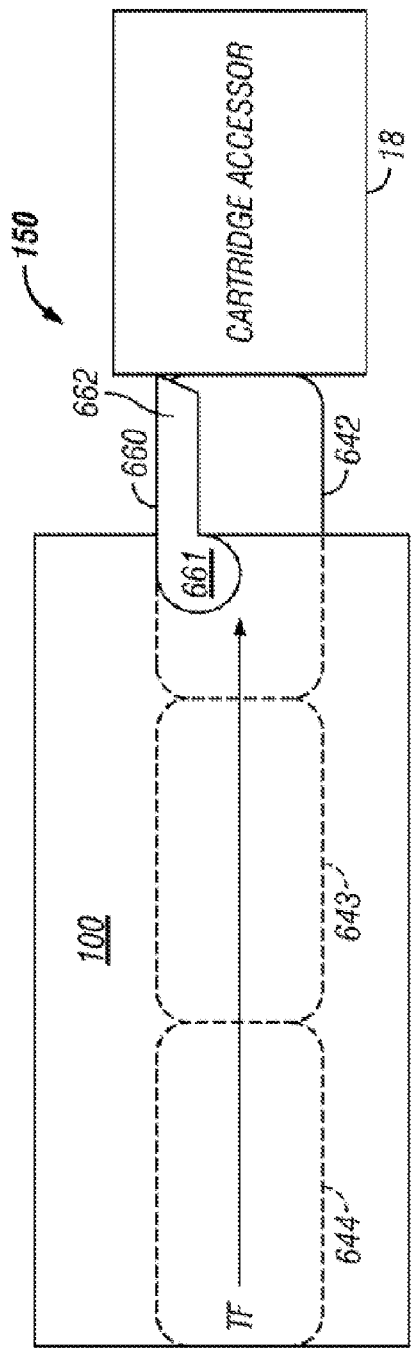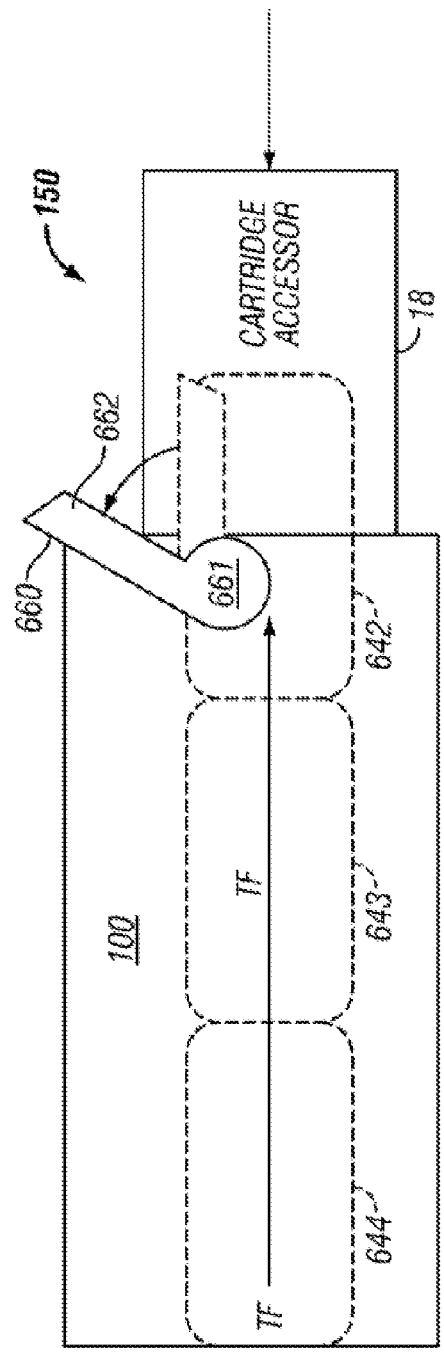
FIG. 8A
FIG. 8B

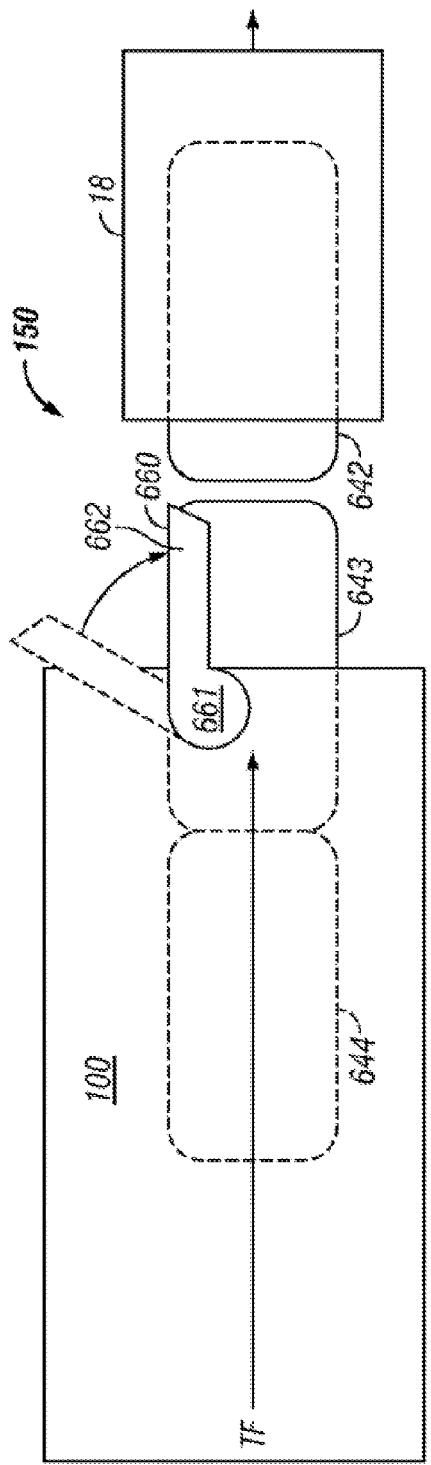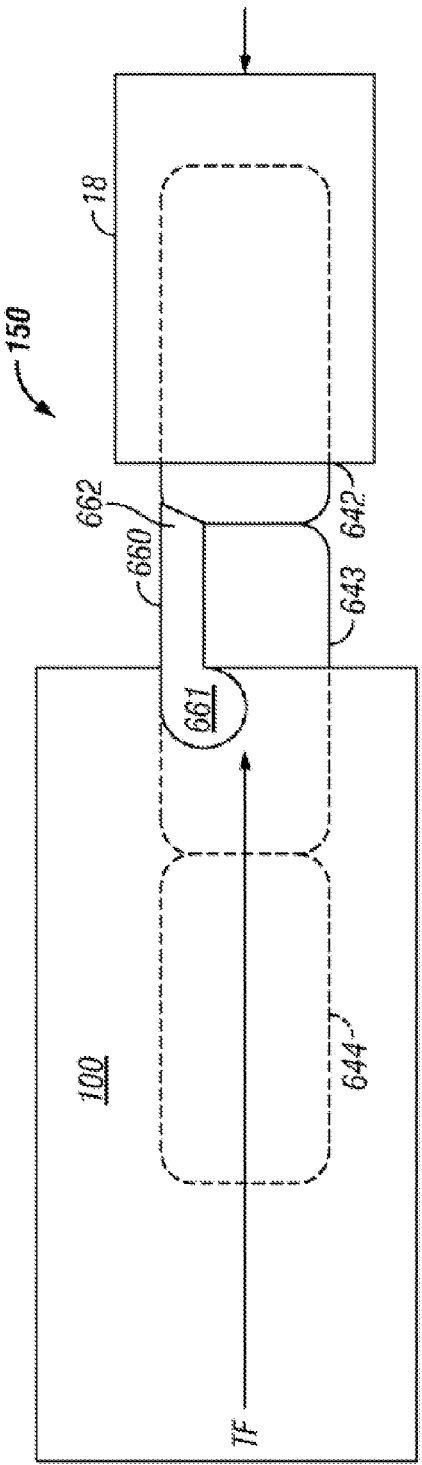

ENHANCED TAPE LIBRARY CATALOGING

BACKGROUND

The present invention relates to data storage systems, and more particularly, this invention relates to cataloging tape libraries using near field communication (NFC) devices.

Automated data storage libraries are known for providing cost effective storage and retrieval of large quantities of data. The data in automated data storage libraries is typically stored on media of data storage cartridges that are, in turn, stored at storage slots or the like inside the library in a fashion that renders the media, and its resident data, accessible for physical retrieval. Such data storage cartridges are commonly termed "removable media." Data storage cartridge media may comprise any type of media on which data may be stored and which may serve as removable media, including but not limited to magnetic media (such as magnetic tape or disks), optical media (such as optical tape or disks), electronic media (such as PROM, EEPROM, flash PROM, CompactFlash™, Smartmedia™, Memory Stick™, etc.), or other suitable media. An example of a data storage cartridge that is widely employed in automated data storage libraries for mass data storage is a magnetic tape cartridge.

In addition to data storage media, automated data storage libraries typically comprise data storage drives that store data to, and/or retrieve data from, the data storage cartridge media. Further, automated data storage libraries typically comprise I/O stations at which data storage cartridges are supplied or added to, or removed from, the library. The transport of data storage cartridges between data storage slots, data storage drives, and I/O stations is typically accomplished by one or more accessors. Such accessors have grippers for physically retrieving the selected data storage cartridges from the storage slots within the automated data storage library and transporting such cartridges to the data storage drives by moving, for example, in the X and Y directions.

In an effort to increase storage capacity, deep slot technology allows for storage cells that contain more than a single data storage cartridge. Such storage libraries allow for higher density, or more cartridges stored per square foot. In "deep slot" libraries, two or more cartridges may be stored in a multi-cartridge deep slot cell, arrayed in series, one behind the other, in tiers ranging from a frontmost tier to a rearmost tier.

In the past, tape libraries have used barcode labels to identify tapes stored in each of the storage cartridges. These labels are attached to an outside of a tape cartridge, and must be read using a line of sight device.

SUMMARY

A tape-based data storage system, according to one embodiment, includes: a tape library having: a plurality cells, each of the cells being configured to store one or more tape cartridges therein, and at least an antenna of a near field communication reader positioned at each of the cells. Moreover, each of the antennas are positioned relative the associated cell to be in direct communication with a near field communication tag coupled to a tape cartridge stored in the associated cell.

A tape-based data storage system, according to one embodiment, includes: a tape library, having: a plurality cells, each of the cells being configured to store one or more tape cartridges therein, and a near field communication reader positioned at each of the cells. Moreover, each of the near field communication readers are positioned relative the associated cell to be in direct communication with a near field communication tag coupled to a tape cartridge stored in the associated cell.

A computer-implemented method, according to one embodiment, includes: using at least an antenna of near field communication readers to scan each cell of a tape library for near field communication tags in the cells, determining that one or more tape cartridges are present in one or more of the cells of the tape library in response to detecting one or more of the near field communication tags in the cells, determining a cell that each of the one or more tape cartridges is located in based on at least one of: a signal strength and information (e.g., metadata) stored on the corresponding near field communication tag, and creating a current distribution of the one or more tape cartridges in the tape library in relation to the cell that each of the one or more tape cartridges is located in.

A computer program product, according to one embodiment, includes a computer readable storage medium having program instructions embodied therewith, wherein the computer readable storage medium is not a transitory signal per se, the program instructions readable and/or executable by a controller to cause the controller to perform a method which includes: using, by the controller, at least one near field communication reader to scan each cell of a tape library for near field communication tags in the cells, determining, by the controller, that one or more tape cartridges are present in one or more of the cells of the tape library in response to detecting one or more of the near field communication tags in the cells, determining, by the controller, a cell that each of the one or more tape cartridges is located in based on at least one of: a signal strength and information (e.g., metadata) stored on the corresponding near field communication tag, and creating, by the controller, a current distribution of the one or more tape cartridges in the tape library in relation to the cell that each of the one or more tape cartridges is located in.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIGS. 8A-8D are partial side views of a cartridge blocking mechanism according to one embodiment.

DETAILED DESCRIPTION

Figure 1:
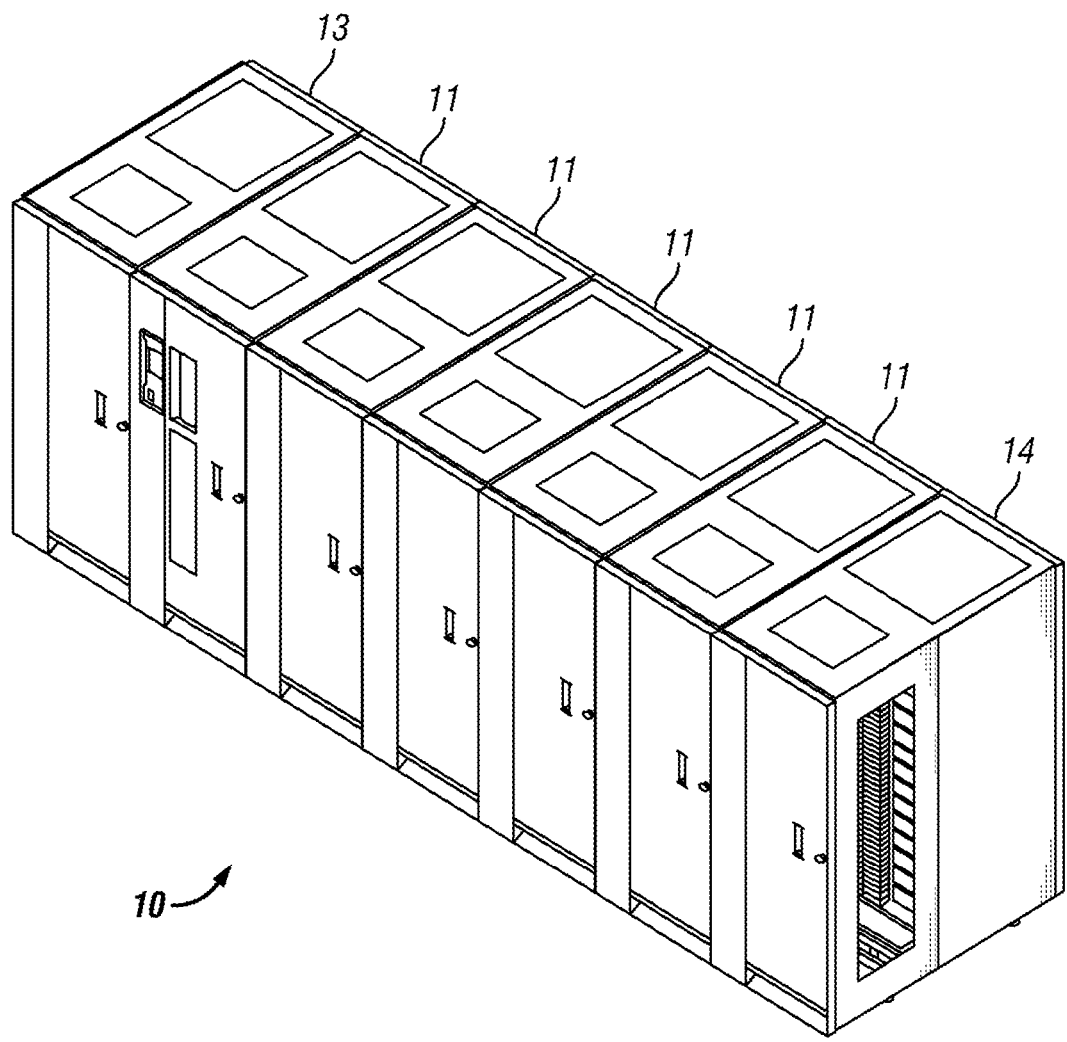
FIG. 1 is a perspective view of an automated data storage library according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of storage systems, as well as operation and/or component parts thereof. Some of the various embodiments described herein implement wireless components, e.g., readers and/or antennas, to establish communication with wireless tags, e.g., on tape cartridges. For example, one embodiment includes a method of inventorying tape cartridges within a library that reduces the time to inventory down to single digits of a percentage as compared to prior approaches. In preferred embodiments, the wireless components include near field communication (NFC) components that have a limited range, thereby reading only small portion of the tags. Moreover, such NFC components are desirably able to perform operations in concert, thereby reducing the amount of time to catalog a given tape library. NFC devices may operate in a high frequency range and have signal strengths which may limit an achievable communication range between NFC devices (e.g., a NFC tag and NFC reader), e.g., depending on a supply voltage, antenna construction, signal strength, power output of an antenna, etc. Additionally, various embodiments allow for other fields that can be used for data mining, cartridge attributes include utilization, most recent usage, encryption, etc.

In one general embodiment, a tape-based data storage system includes: a tape library having: a plurality cells, each of the cells being configured to store one or more tape cartridges therein, and at least an antenna of a near field communication reader positioned at each of the cells. Moreover, each of the antennas are positioned relative the associated cell to be in direct communication with a near field communication tag coupled to a tape cartridge stored in the associated cell.

In another general embodiment, a tape-based data storage system includes: a tape library, having: a plurality cells, each of the cells being configured to store one or more tape cartridges therein, and a near field communication reader positioned at each of the cells. Moreover, each of the near field communication readers are positioned relative the associated cell to be in direct communication with a near field communication tag coupled to a tape cartridge stored in the associated cell.

In another general embodiment, a computer-implemented method includes: using at least an antenna of near field communication readers to scan each cell of a tape library for near field communication tags in the cells, determining that one or more tape cartridges are present in one or more of the cells of the tape library in response to detecting one or more of the near field communication tags in the cells, determining a cell that each of the one or more tape cartridges is located in based on at least one of: a signal strength and information (e.g., metadata) stored on the corresponding near field communication tag, and creating a current distribution of the one or more tape cartridges in the tape library in relation to the cell that each of the one or more tape cartridges is located in.

In yet another general embodiment, a computer program product includes a computer readable storage medium having program instructions embodied therewith, wherein the computer readable storage medium is not a transitory signal per se, the program instructions readable and/or executable by a controller to cause the controller to perform a method which includes: using, by the controller, at least one near field communication reader to scan each cell of a tape library for near field communication tags in the cells, determining, by the controller, that one or more tape cartridges are present in one or more of the cells of the tape library in response to detecting one or more of the near field communication tags in the cells, determining, by the controller, a cell that each of the one or more tape cartridges is located in based on at least one of: a signal strength and information (e.g., metadata) stored on the corresponding near field communication tag, and creating, by the controller, a current distribution of the one or more tape cartridges in the tape library in relation to the cell that each of the one or more tape cartridges is located in.

Figure 2:
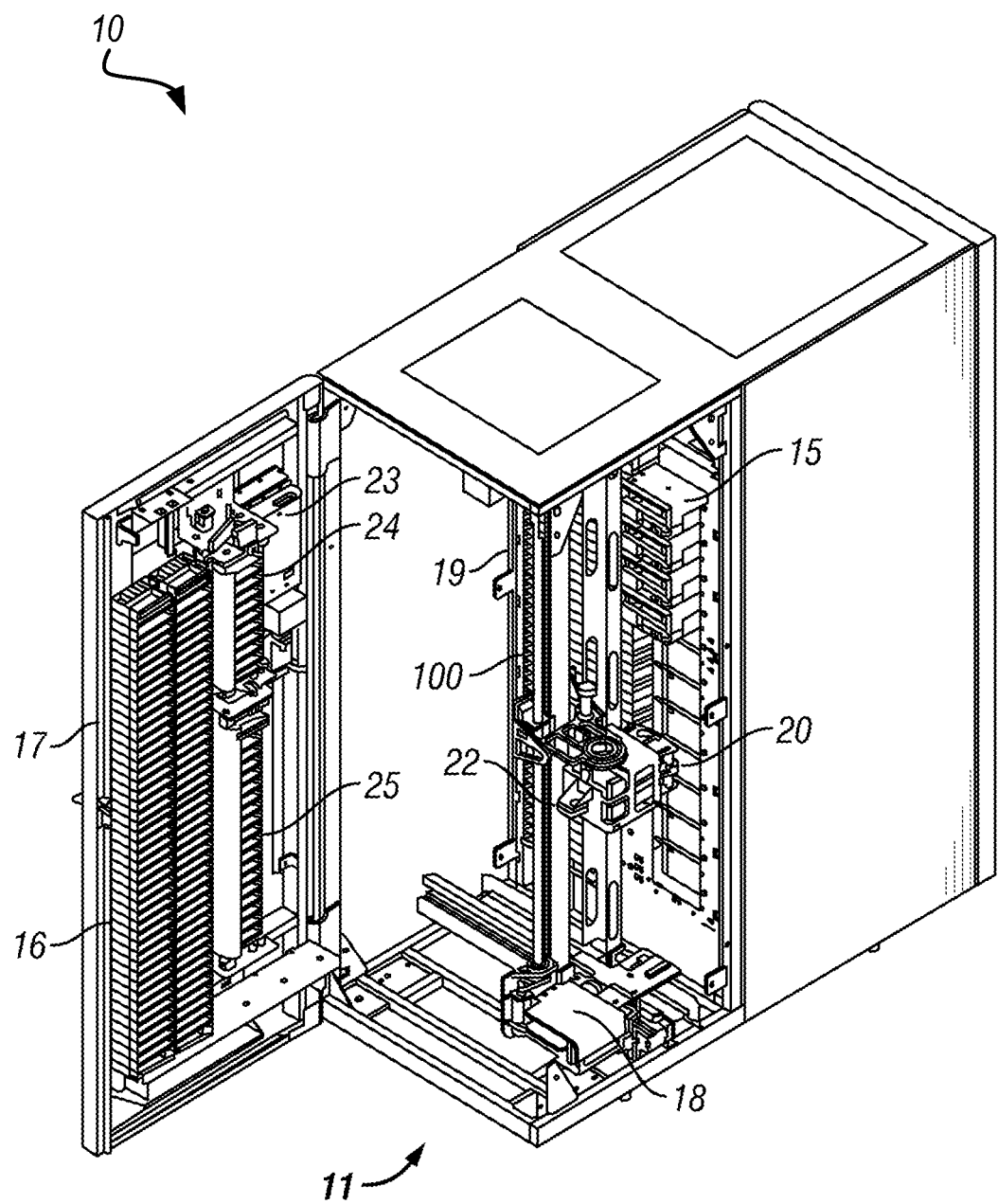
FIG. 2 is a perspective view of a storage frame from the data storage library of FIG. 1.

FIGS. 1-2 illustrate an automated data storage library 10 which stores and retrieves data storage cartridges, containing data storage media (not shown), from multi-cartridge deep slot cells 100 and single cartridge storage slots 16. An example of an automated data storage library which has a similar configuration as that depicted in FIGS. 1-2, and may be implemented with some of the various approaches herein is the IBM 3584 UltraScalable Tape Library. Moreover, it should be noted that references to "data storage media" herein refer to data storage cartridges, and for purposes of the present application, the two terms may be used synonymously.

The library 10 of FIG. 1 comprises a left hand service bay 13, one or more storage frames 11, and right hand service bay 14. As will be discussed in further detail below, a frame may comprise an expansion component of the library. Thus, storage frames may be added or removed to expand or reduce the size and/or functionality of the library. According to different approaches, frames may include additional storage slots, deep slot cells, drives, import/export stations, accessors, operator panels, etc.

FIG. 2 shows an exemplary embodiment of a storage frame 11, which acts as the base frame of the library 10. Moreover, the storage frame 11 illustrated in FIG. 2 is contemplated to be a minimum configuration of the library 10, for which there is only a single accessor 18 (i.e., there are no redundant accessors) and no service bay. However, in other embodiments, a storage frame may include multiple robotic accessors and/or service bays.

Looking to FIG. 2, the library 10 is arranged for accessing data storage media in response to commands from at least one external host system (not shown). The library 10 includes a plurality of storage slots 16 on front wall 17 and a plurality of multi-cartridge deep slot cells 100 on rear wall 19, both of which may be used to storing data storage cartridges that may contain data storage media. According to one approach, the storage slots 16 are configured to store a single data storage cartridge, and the multi-cartridge deep slot cells 100 are configured to store a plurality of data storage cartridges. In a preferred approach, the multi-cartridge deep slot cells may be arranged in sequential order of tiers from front to rear (e.g., see FIG. 7A).

With continued reference to FIG. 2, the storage frame 11 of the library 10 also includes at least one data storage drive 15, e.g., for reading and/or writing data with respect to the data storage media. Additionally, a first accessor 18 may be used to transport data storage media between the plurality of storage slots 16, the multi-cartridge deep slot cells, and/or the data storage drive(s) 15. According to various approaches, the data storage drives 15 may be optical disk drives, magnetic tape drives, or other types of data storage drives as are used to read and/or write data with respect to the data storage media.

As illustrated, the storage frame 11 may optionally include an operator panel 23 or other user interface, such as a web-based interface, which allows a user to interact with the library 10. The storage frame 11 may also optionally comprise an upper I/O station 24 and/or a lower I/O station 25, thereby allowing data storage cartridges to be added (e.g., inserted) to the library inventory and/or removed from the library without disrupting library operation. Furthermore, the library 10 may have one or more storage frames 11, each having storage slots 16, preferably accessible by the first accessor 18.

As described above, the storage frames 11 may be configured with different components depending upon the intended function. One configuration of storage frame 11 may comprise storage slots 16 and/or multi-cartridge deep slot cells 100, data storage drive(s) 15, and other optional components to store and retrieve data from the data storage cartridges. However, in another approach, a storage frame 11 may include storage slots 16 and/or multi-cartridge deep slot cells 100 and no other components. The first accessor 18 may have a gripper assembly 20, e.g., for gripping one or more data storage media, in addition to having a bar code scanner 22 or other reading system, such as a cartridge memory reader or similar system mounted on the gripper assembly 20, to "read" identifying information about the data storage media.

Figure 3:
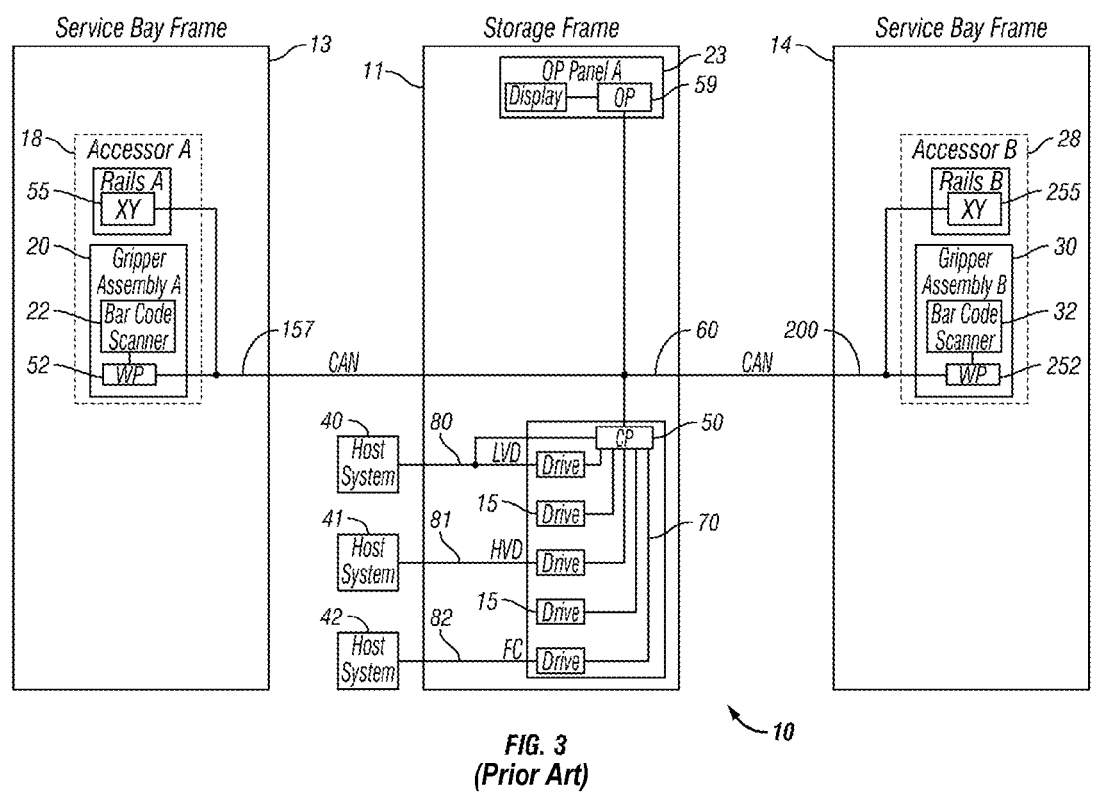
FIG. 3 is a block diagram of an automated data storage library according to one embodiment.

FIG. 3 depicts an automated data storage library 10, in accordance with one embodiment. As an option, the present automated data storage library 10 may be implemented in conjunction with features from any other embodiment listed herein, such as those described with reference to the other FIGS. Of course, however, such automated data storage library 10 and others presented herein may be used in various applications and/or in permutations which may or may not be specifically described in the illustrative embodiments listed herein. Further, the automated data storage library 10 presented herein may be used in any desired environment. Thus FIG. 3 (and the other FIGS.) should be deemed to include any and all possible permutations Referring now to FIG. 3, the automated data storage library 10 as described in reference to FIGS. 1 and 2, is depicted according to one embodiment. According to a preferred approach, the library 10 may employ a controller, e.g., arranged as a distributed system of modules with a plurality of processor nodes.

In one approach, the library is controlled, not by a central controller, but rather, by a distributed control system for receiving logical commands and converting the commands to physical movements of the accessor and gripper, and for operating the drives in accordance with the desired physical movements. The distributed control system may also provide logistical support, such as responding to host requests for element status, inventory, library status, etc. The specific commands, the conversion of those commands to physical movements, and the operation of the drives may be of a type known to those of skill in the art.

While the automated data storage library 10 has been described as employing a distributed control system, various other approaches described and/or suggested herein may be implemented in automated data storage libraries regardless of control configuration, such as, but not limited to, an automated data storage library having one or more library controllers that are not distributed.

Referring still to FIG. 3, the library 10 may have one or more storage frames 11, a left hand service bay 13 and a right hand service bay 14. The left hand service bay 13 is shown with a first accessor 18, where, as discussed above, the first accessor 18 may include a gripper assembly 20 and/or a reading system 22 to "read" identifying information about the data storage media depending on the desired embodiment. Furthermore, the right hand service bay 14 is shown having a second accessor 28, which includes a gripper assembly 30 and may also include a reading system 32 to "read" identifying information about the data storage media.

According to one approach, in the event of a failure or other unavailability of the first accessor 18, or its gripper assembly 20, etc., the second accessor 28 may perform some or all of the functions of the first accessor 18. Thus in different approaches, the two accessors 18, 28 may share one or more mechanical paths, they may have completely independent mechanical paths, or combinations thereof. In one example, the accessors 18, 28 may have a common horizontal rail with independent vertical rails to travel therealong. Moreover, it should be noted that the first and second accessors 18, 28 are described as first and second for descriptive purposes only and this description is not meant to limit either accessor to an association with either the left hand service bay 13, or the right hand service bay 14.

In an exemplary embodiment which is in no way intended to limit the invention, the first and second accessors 18, 28 may preferably move their grippers in at least two directions, called the horizontal "X" direction and vertical "Y" direction, e.g., to retrieve and grip, deliver and release, load and unload, etc. the data storage cartridge at the storage slots 16, multi-cartridge deep slot cells 100, data storage drives 15, etc.

With continued reference to FIG. 3, library 10 receives commands from one or more host systems 40, 41, 42. The host systems 40, 41, 42, such as host servers, communicate with the library directly, e.g., on input 80, through one or more control ports (not shown), or through one or more data storage drives 15 on inputs 81, 82. Thus, in different approaches, the host systems 40, 41, 42 may provide commands to access particular data storage cartridges and move the cartridges, for example, between the storage slots 16 and the data storage drives 15. The commands are typically logical commands identifying the cartridges or cartridge media, and/or logical locations for accessing the media. Furthermore, it should be noted that the terms "commands" and "work requests" are used interchangeably herein to refer to such communications from the host system 40, 41, 42 to the library 10 as are intended to result in accessing particular data storage media within the library 10 depending on the desired approach.

According to one embodiment, the library 10 may be controlled by a library controller. Moreover, in various approaches, the library controller may include a distributed control system receiving the logical commands from hosts, determining the required actions, and/or converting the actions to physical movements of the first and/or second accessor 18, 28. In another approach, the distributed control system may have a plurality of processor nodes, each having one or more computer processors. According to one example of a distributed control system, a communication processor node 50 may be located in a storage frame 11. The communication processor node provides a communication link for receiving the host commands, either directly or through the drives 15, via at least one external interface, e.g., coupled to input 80.

Still referring to FIG. 3, the communication processor node 50 may additionally provide a communication link 70 for communicating with the data storage drives 15. As illustrated, the communication processor node 50 may preferably be located in the storage frame 11, e.g., close to the data storage drives 15. Furthermore, one or more additional work processor nodes may be provided to form an exemplary distributed processor system, which may comprise, e.g., a work processor node 52 located at first accessor 18, and that is coupled to the communication processor node 50 via a network 60, 157. According to different approaches, each work processor node may respond to received commands that are broadcast thereto from any communication processor node, and the work processor nodes may also direct the operation of the accessors, e.g., providing move commands. An XY processor node 55 may be provided and may be located at an XY system of first accessor 18. As illustrated, the XY processor node 55 is coupled to the network 60, 157, and is responsive to the move commands, operating the XY system to position the gripper assembly 20.

Also, an operator panel processor node 59 may be provided at the optional operator panel 23 for providing an interface for communicating between the operator panel and the communication processor node 50, the work processor nodes 52, 252, and the XY processor nodes 55, 255.

A network 60, for example comprising a common bus, is provided, coupling the various processor nodes. The network may comprise a robust wiring network, such as the commercially available Controller Area Network (CAN) bus system, which is a multi-drop network, having a standard access protocol and wiring standards, for example, as defined by CiA, the CAN in Automation Association, Am Weich Selgarten 26, D-91058 Erlangen, Germany. Other networks, such as Ethernet, or a wireless network system, such as RF or infrared, may be employed in the library as is known to those of skill in the art. In addition, multiple independent networks may also be used to couple the various processor nodes.

As illustrated in FIG. 3, the communication processor node 50 is coupled to each of the data storage drives 15 of a storage frame 11, via lines 70, and are thereby communicating with the drives 15 and with host systems 40, 41, 42. Alternatively, the host systems 40, 41, 42 may be directly coupled to the communication processor node 50, at input 80 for example, or to control port devices (not shown) which connect the library to the host system(s) with a library interface similar to the drive/library interface. As is known to those of skill in the art, various communication arrangements may be employed for communication with the hosts and with the data storage drives. In the example of FIG. 3, host inputs 80 and 81 are intended to be SCSI busses. However, input 82 may be a bus which comprises an example of a Fibre Channel bus which is a high speed serial data interface, allowing transmission over greater distances than the SCSI bus systems.

According to some approaches, the data storage drives 15 may be in close proximity to the communication processor node 50, and may employ a short distance communication scheme, such as SCSI, or a serial connection, such as RS-422. Thus the data storage drives 15 may be individually coupled to the communication processor node 50 by lines 70. Alternatively, the data storage drives 15 may be coupled to the communication processor node 50 through one or more networks, such as a common bus network.

Furthermore, additional storage frames 11 may be provided, whereby each is preferably coupled to the adjacent storage frame. According to various approaches, any of the additional storage frames 11 may include communication processor nodes 50, storage slots 16, data storage drives 15, networks 60, etc.

Moreover, as described above, the automated data storage library 10 may comprise a plurality of accessors. A second accessor 28, for example, is shown in a right hand service bay 14 of FIG. 3. The second accessor 28 may include a gripper assembly 30 for accessing the data storage media, and an XY system 255 for moving the second accessor 28. The second accessor 28 may run on the same horizontal mechanical path as the first accessor 18, and/or on an adjacent (e.g., separate) path. Moreover the illustrative control system additionally includes an extension network 200 which forms a network coupled to network 60 of the storage frame(s) 11 and to network 157 of left hand service bay 13.

In FIG. 3 and the accompanying description, the first and second accessors are associated with the left hand service bay 13 and the right hand service bay 14 respectively. However, this is for illustrative purposes and there may not be an actual association. Thus, according to another approach, network 157 may not be associated with the left hand service bay 13 and network 200 may not be associated with the right hand service bay 14. Moreover, depending on the design of the library, it may not be necessary to have a left hand service bay 13 and/or a right hand service bay 14 at all.

An automated data storage library 10 typically comprises one or more controllers to direct the operation of the automated data storage library. Moreover, host computers and data storage drives typically include similar controllers. A library controller may take many different forms and may comprise, for example, but is not limited to, an embedded system, a distributed control system, a personal computer, a workstation, etc. The term "library controller" as used herein is intended in its broadest sense as a device that includes at least one processor, and optionally further circuitry and/or logic, for controlling and/or providing at least some aspects of library operations.

Figure 4:
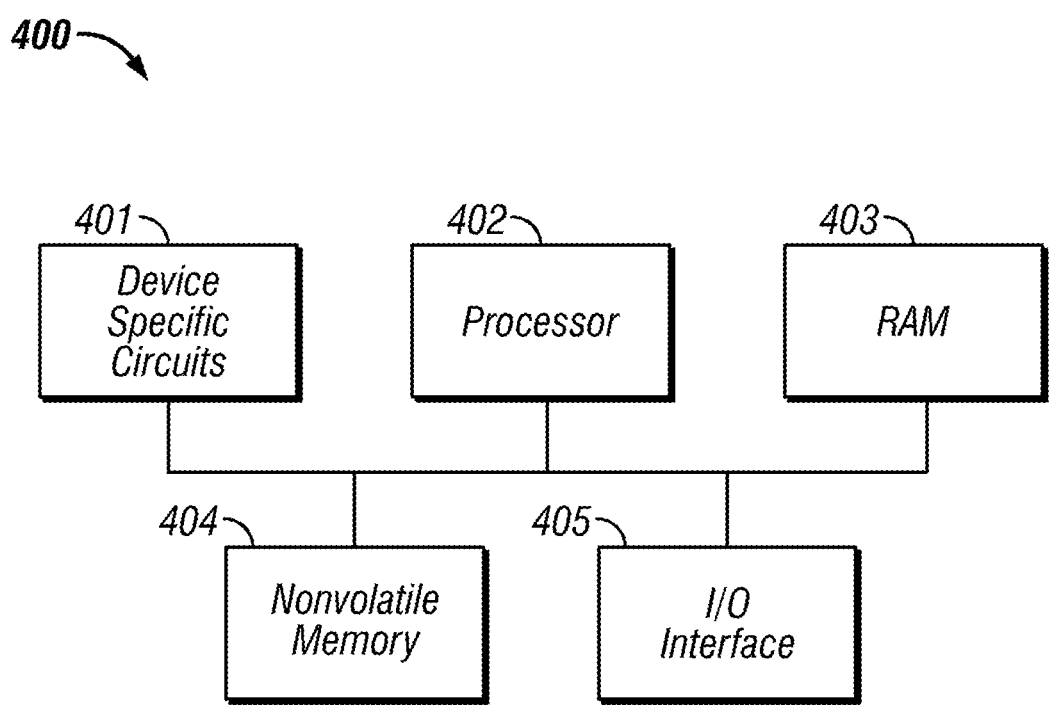
FIG. 4 is a block diagram depicting a controller configuration according to one embodiment.

Referring now to FIG. 4, a typical controller 400 is shown with a processor 402, Random Access Memory (RAM) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, Field Programmable Gate Array (FPGA), Application Specific Integrated Circuit (ASIC), discrete logic, etc. The RAM 403 is typically used to hold variable data, stack data, executable instructions, etc.

According to various approaches, the nonvolatile memory 404 may comprise any type of nonvolatile memory such as, but not limited to, Electrically Erasable Programmable Read Only Memory (EEPROM), flash Programmable Read Only Memory (PROM), battery backup RAM, hard disk drives, etc. However, the nonvolatile memory 404 is typically used to hold the executable firmware and any nonvolatile data. Moreover, the I/O interface 405 comprises a communication interface that allows the processor 402 to communicate with devices external to the controller. Examples may comprise, but are not limited to, serial interfaces such as RS-232, USB (Universal Serial Bus) or Small Computer Systems Interface (SCSI). The device specific circuits 401 provide additional hardware to enable the controller 400 to perform unique functions including, but not limited to, motor control of a cartridge gripper. Moreover, the device specific circuits 401 may include electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the controller 400.

While the automated data storage library 10 is described as employing a distributed control system, the various approaches described and/or suggested herein may be implemented in various automated data storage libraries regardless of control configuration, including, but not limited to, an automated data storage library having one or more library controllers that are not distributed. Moreover, a library controller may comprise one or more dedicated controllers of a library, depending on the desired embodiment. For example, there may be a primary controller and a backup controller. In addition, a library controller may comprise one or more processor nodes of a distributed control system. According to one example, communication processor node 50 (e.g., of FIG. 3) may comprise the library controller while the other processor nodes (if present) may assist the library controller and/or may provide backup or redundant functionality. In another example, communication processor node 50 and work processor node 52 may work cooperatively to form the library controller while the other processor nodes (if present) may assist the library controller and/or may provide backup or redundant functionality. Still further, all of the processor nodes may comprise the library controller. According to various approaches described and/or suggested herein, a library controller may have a single processor or controller, or it may include multiple processors or controllers.

Figure 5A:
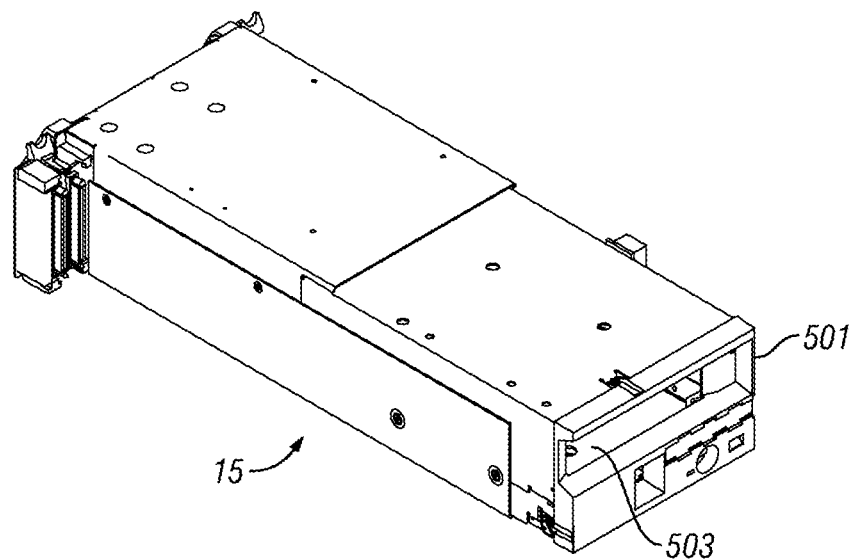
FIG. 5A is a frontal perspective view of a data storage drive according to one embodiment.
Figure 5B:
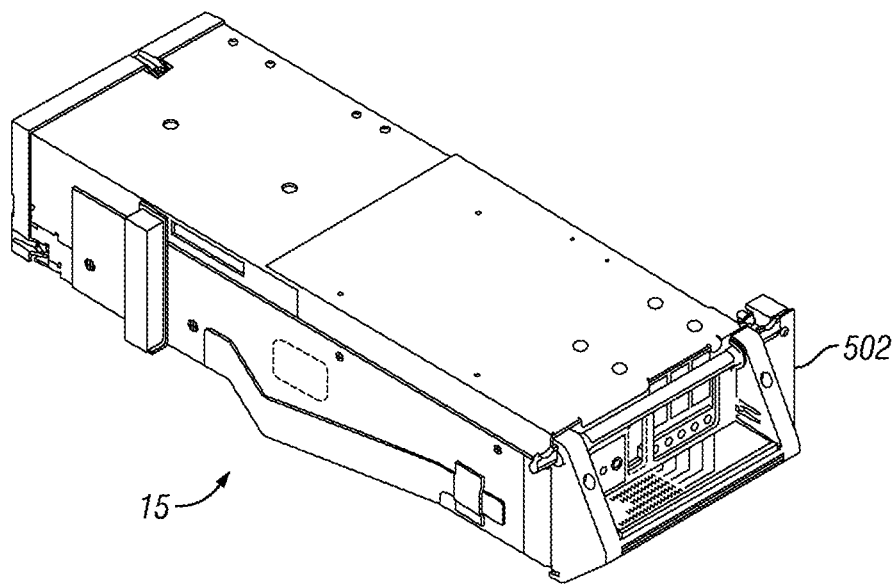
FIG. 5B is a rear perspective view of the data storage drive of FIG. 5A.

FIGS. 5A-5B illustrate the front 501 and rear 502 views of a data storage drive 15, according to one embodiment. In the example depicted in FIGS. 5A-5B, the data storage drive 15 comprises a hot-swap drive canister, which is in no way intended to limit the invention. In fact, any configuration of data storage drive may be used whether or not it includes a hot-swap canister. As discussed above, a data storage drive 15 is used to read and/or write data with respect to the data storage media, and may additionally communicate with a memory which is separate from the media, and is located within the cartridge. Thus, according to one approach, a data storage cartridge may be placed into the data storage drive 15 at opening 503.

Figure 6:
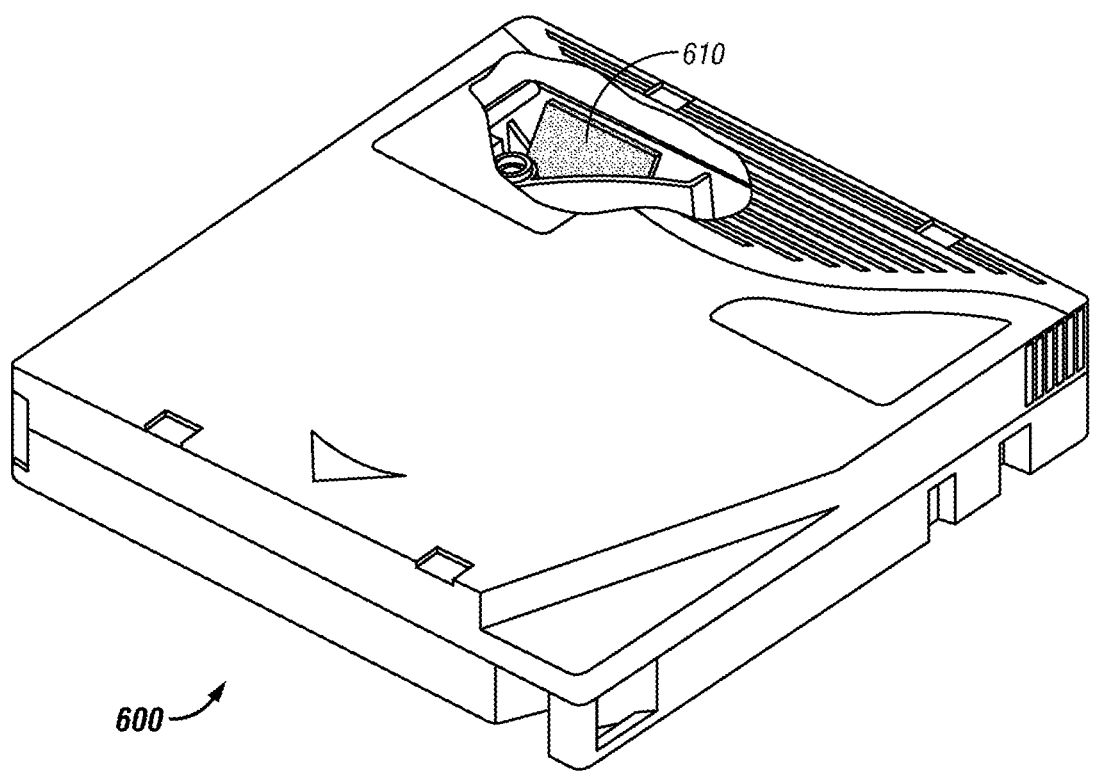
FIG. 6 is perspective view of a data storage cartridge having a cutaway portion, according to one embodiment.

Furthermore, FIG. 6 illustrates an embodiment of a data storage cartridge 600 with a cartridge memory 610 shown in a cutaway portion of the Figure, which is in no way intended to limit the invention. In fact, any configuration of data storage cartridge may be used whether or not it comprises a cartridge memory. According to various approaches, media of the data storage cartridge media may include any type of media on which data may be stored, including but not limited to magnetic media, e.g., magnetic tape, disks, etc.; optical media, e.g., optical tape, disks, etc.; electronic media, e.g., PROM, EEPROM, flash PROM, CompactFlash™, Smartmedia™, Memory Stick™, etc.; etc., or other suitable media. Moreover, an example of a data storage cartridge that is widely employed in automated data storage libraries for mass data storage is a magnetic tape cartridge in which the media is magnetic tape.

Figure 7A:
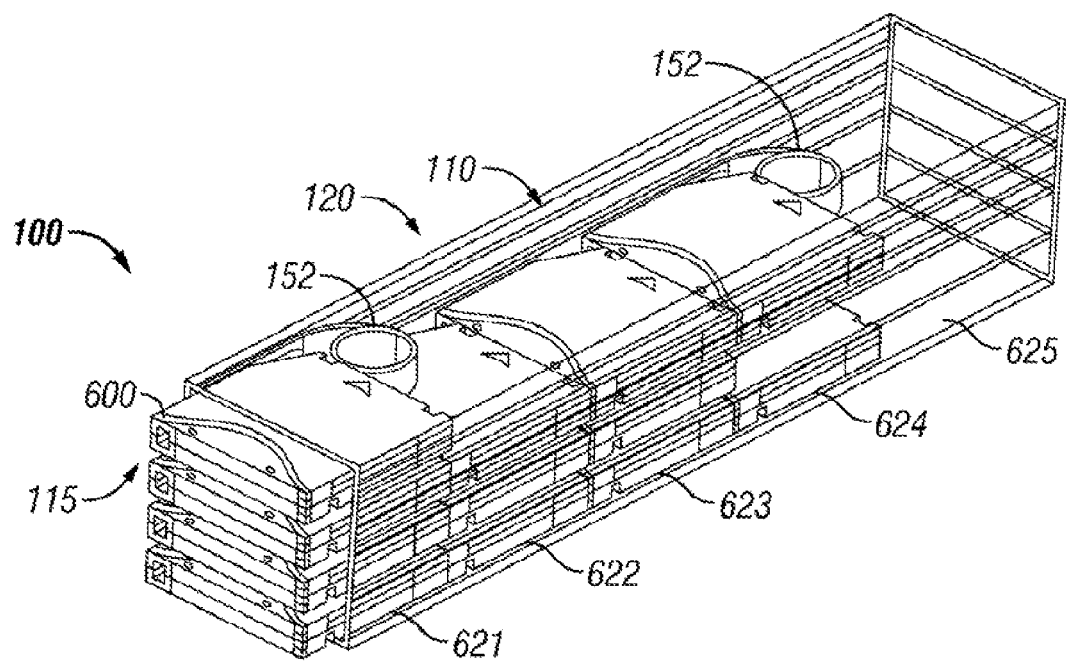
FIGS. 7A-7B are perspective views of a multi-cartridge deep slot cell according to one embodiment.
Figure 7B:
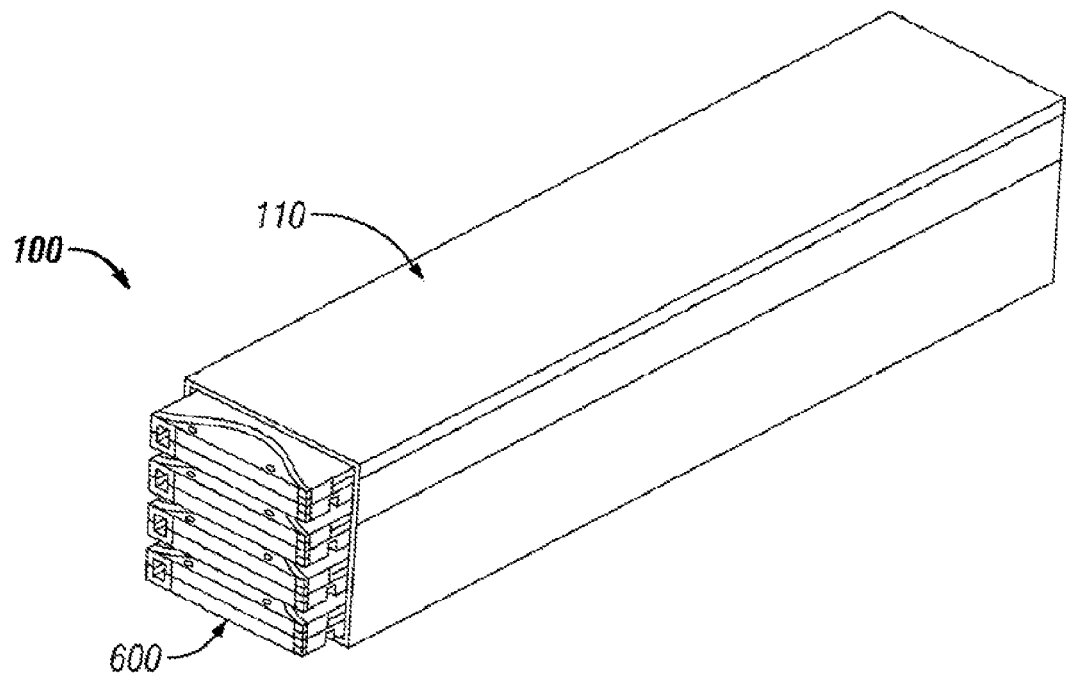

Looking now to FIGS. 7A-7B, a multi-cartridge deep slot cell 100 having biasing springs 152 is depicted according to one embodiment. As shown in the illustrative embodiment, the multi-cartridge deep slot cell 100 comprises a housing 110 defining an interior space 115. Furthermore, a plurality of storage slots 120 is disposed within the housing, and may be configured for storing up to a plurality of data storage cartridges 600, depending on the desired approach. Alternatively, the multi-cartridge deep slot cell 100 may be built into the frame of the automated data storage library according to one approach.

FIGS. 8A-8D illustrate an embodiment of a cartridge blocking mechanism 150 having a retaining gate 660 that retains the data storage cartridges in the multi-cartridge deep slot cell 100 according to one embodiment. As illustrated, according to one approach, the retaining gate 660 may be externally attached to a multi-cartridge deep slot cell 100, relative to a front opening of the multi-cartridge deep slot cell 100, whereby the retaining gate 660 can be activated by an accessor 18, e.g., of an automated tape library. Moreover, the retaining gate 660 allows for positive cartridge retention against the pressure of biasing springs (see 152 of FIGS. 7A-7B), and ensures that one or more data storage cartridges do not get pushed out of the multi-cartridge deep slot cell 100 simultaneously, while allowing the pushing mechanism (not shown) of the multi-cartridge deep slot cell 100 to continuously push data storage cartridge(s) to the opening in a multi-cartridge deep slot cell 100. Thus, according to one approach, the accessor 18 may open the retaining gate to gain access to the data storage cartridge in tier 1 and, upon its extraction, the biasing spring 152 moves the cartridge(s) positioned behind the extracted cartridge forward, thereby promoting the cartridge(s) by one tier as will soon become apparent.

The basic working of the retaining gate is that the gate prevents the data storage cartridge(s) from being pushed out of a multi-cartridge deep slot cell 100. For example, as shown in FIGS. 8A-8D, a retaining gate 660 can be lifted by, for example, accessor 18 or by a front storage cartridge 642 for cartridge removal from/insertion into a multi-cartridge deep slot cell 100. Specifically, retaining gate 660 has a pivoting arm 661 mounted on multi-cartridge deep slot cell 100 via a pivoting post (not shown) that can be integral to a construction of multi-cartridge deep slot cell 100. Pivoting arm 661 is located below a catch 662 of retaining gate 660 whereby a thrust force TF through data storage cartridge 644-642 caused by the pushing mechanism (not shown) of multi-cartridge deep slot cell 100 causes retaining gate 660 to stay closed in a retaining position as shown in FIG. 8A. Moreover, the retaining gate 660 is preferably biased such that it closes in the downward direction over the front opening of multi-cartridge deep slot cell 100. This constant biasing may be achieved via gravity as shown in FIG. 8A or by implementing a spring force, e.g., attached to retaining gate 660 (not shown).

For removal of front storage cartridge 642 by accessor 18 from multi-cartridge deep slot cell 100, retaining gate 660 must be lifted upward to a releasing position whereby catch 662 of retaining gate 660 is disengaged from front storage cartridge 642. This can be seen in FIG. 8B where accessor 18 interfaces with retaining gate 660 by providing a lifting force. Once retaining gate 660 is lifted to the releasing position and accessor 18 is engaged with storage cartridge 642, accessor 18 can pull storage cartridge 642 out of multi-cartridge deep slot cell 100 and into accessor 18 without any interference of retaining gate 660 as shown in FIG. 8C. In view of storage cartridges 644 and 643 being stored in multi-cartridge deep slot cell 100, retaining gate 660 must return to its retaining position to prevent storage cartridges 644 and 643 from being ejected from multi-cartridge deep slot cell 100 by the thrust force TF of the pushing mechanism (not shown). During extraction of front storage cartridge 642 through the front opening of multi-cartridge deep slot cell 100, the retaining gate 660, which is being biased downward, moves back to the retaining position to engage storage cartridge 643.

Once front storage cartridge 642 is extracted and storage cartridges 643 and 644 are retained from being pushed out of multi-cartridge deep slot cell 100, retaining gate 660 has successfully completed its cartridge retrieval process. Now retaining gate 660 demonstrates its ability to work for cartridge insertion into multi-cartridge deep slot cell 100. When accessor 18 begins to insert storage cartridge 642 back into multi-cartridge deep slot cell 100, retaining gate 660 is lifted to its releasing position to allow storage cartridge 642 through the front opening of multi-cartridge deep slot cell 100. Catch 662 of retaining gate 660 interfaces with a rear portion of storage cartridge 642, in particular a beveled surface of catch 662 as shown in FIG. 8D, whereby retaining gate 660 is lifted to its releasing position as shown in FIG. 8B due to storage cartridge 642 being pushed in multi-cartridge deep slot cell 100 by accessor 18. In doing so, storage cartridges 644, 643 are pushed deeper into multi-cartridge deep slot cell 100 by storage cartridge 642 in multi-cartridge deep slot cell 100 by accessor 18. Thus, the accessor is able to provide a force greater than the thrust force TF antiparallel thereto, to overcome the directional biasing of the storage cartridges 644, 643. Upon full insertion into multi-cartridge deep slot cell 100, retaining gate 660 moves to its retaining position to engage storage cartridge 642 as shown in FIG. 8A.

Thus, looking to various embodiments presented herein, access to a storage slot may include the ability to remove a cartridge from a storage slot, the ability to place a cartridge into a storage slot, or combinations thereof.

According to an exemplary embodiment, the storage slots from top to bottom are considered to be in parallel and comprise the same tier. Moreover, the storage slots from front to back, in a particular row, are considered to be in series and comprise sequential tiers.

Referring back to FIGS. 7A-7B, in accordance with one embodiment, storage slots 120 are depicted as being configured for storing up to a plurality of data storage cartridges 600, and arranged in sequential order of tiers 621, 622, 623, 624, 625 from front to rear. It should be noted that the frontmost tier 621 is also called "tier 1", while the next tier 622 is called "tier 2", etc., and the last tier 625 is also called the "rearmost" tier. However, referring to FIG. 2, in one embodiment, the single cartridge storage slots 16 are also termed "tier 0".

Referring again to FIGS. 1-3, according to one embodiment, the controller of automated data storage library 10 may operate the accessor(s) 18, 28 to selectively extract, place and/or transport data storage cartridges with respect to the multi-cartridge deep slot cells 100 and/or other elements of the automated data storage library 10. For example, the controller may facilitate extracting a cartridge from a multi-cartridge deep slot cell 100, transporting the cartridge to a data storage drive 15 and placing the cartridge in the drive 15. The controller may then extract the cartridge from the data storage drive 15, while directing the accessor to transport the cartridge to a specific multi-cartridge deep slot cell 100, and place the cartridge therein.

In one embodiment, one or more data storage cartridges may be added into the library, e.g., at an I/O station 24, 25, whereby the controller of the automated data storage library 10 may then operate the accessor(s) 18, 28 to transport the cartridge(s) to specific multi-cartridge deep slot cell(s) 100, and place the cartridge(s) therein. Similarly, the controller may operate the accessor(s) to selectively extract, place and transport data storage cartridges with respect to the single cartridge storage slots 16, and/or transport inserted or added cartridge(s) to specific single cartridge storage slots 16.

Previous attempts to catalogue tape libraries have included the use of identification labels, such as barcodes, which require a line of sight to read. These line of sight identification labels have been attached to the outer surface of a tape and/or tape housing, such that a robotic device may use a laser scanner to scan the identification labels. However, physical interference with the identification labels, the scanner and/or the line of sight between the scanner and labels may cause issues when attempting to identify a given tape. For example, smudged and/or wrinkled barcodes may fail to scan.

Moreover, the amount of information stored on a barcode may be limited to a serial number while additional information pertaining to the serial number has to be read from the tape and/or accessed from memory.

Further still, tape libraries may include a substantial number of tapes stored therein. Thus, fulfilling requests to inventory a tape library may use a great deal of time by having to re-scan every barcode label to account for insertions, deletions, repositioning, etc. of tapes within the tape library.

In sharp contrast to the aforementioned shortcomings of previous attempts to catalog tape libraries, the embodiments described and/or suggested herein improve efficiency of tape library cataloging. According to various embodiments described herein, implementing NFC components capable of being interconnected and capable of performing operations together greatly reduce the amount of time for cataloging a tape library, as will be described in further detail below.

Figure 9A:
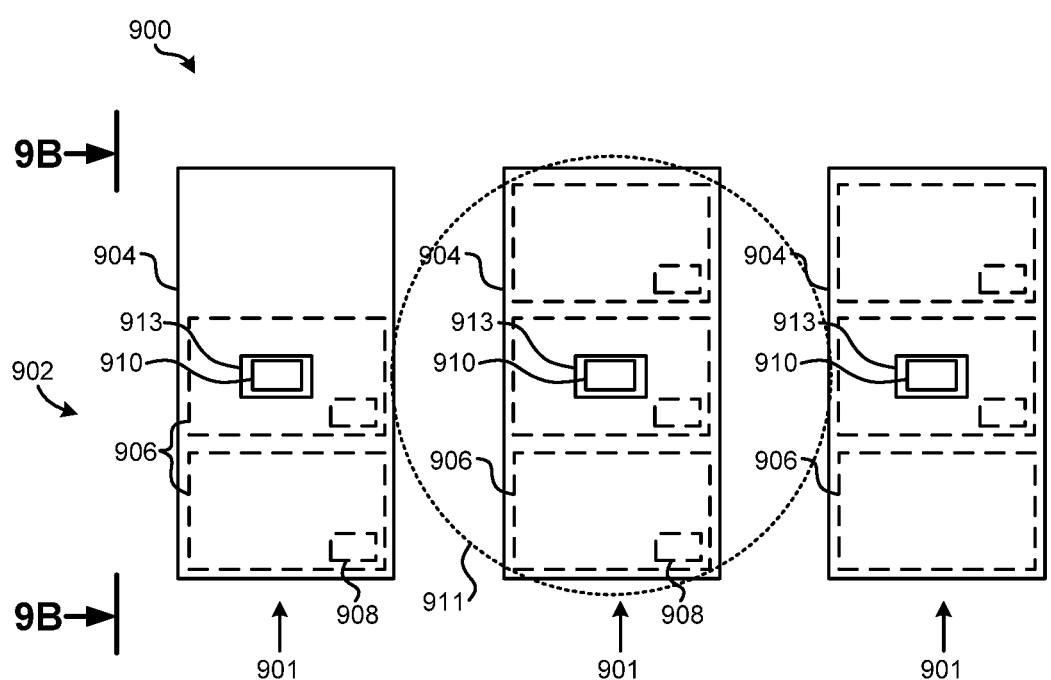
FIG. 9A is a partial representational diagram of a tape-based data storage system according to one embodiment.
Figure 9B:
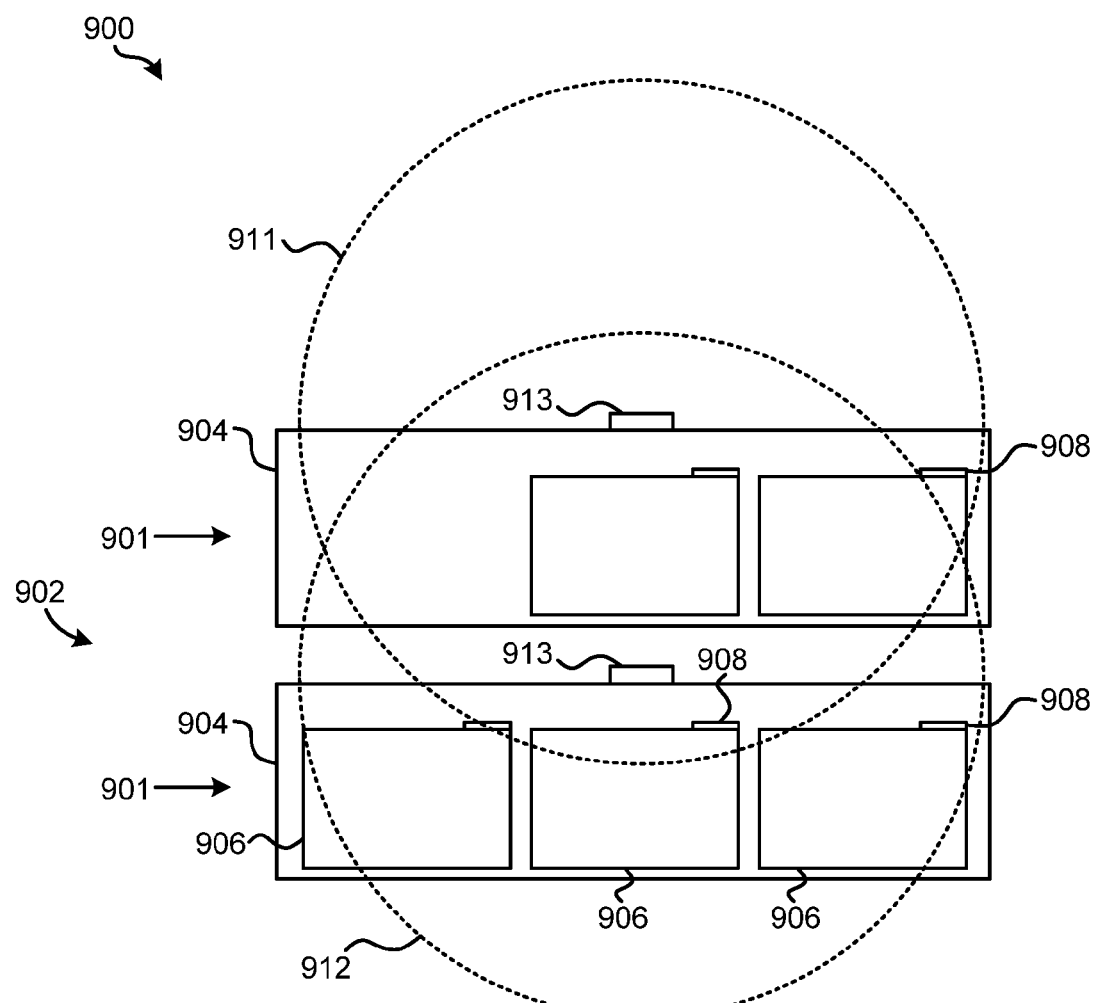
FIG. 9B is a partial side view of the tape-based data storage system of FIG. 9A taken along line 9B-9B.

Looking to FIGS. 9A-9B, a tape-based data storage system 900 is depicted in accordance with one embodiment. As an option, the present tape-based data storage system 900 may be implemented in conjunction with features from any other embodiment listed herein, such as those described with reference to the other FIGS., such as FIGS. 1-2. However, such tape-based data storage system 900 and others presented herein may be used in various applications and/or in permutations which may or may not be specifically described in the illustrative embodiments listed herein. Further, the tape-based data storage system 900 presented herein may be used in any desired environment. Thus FIGS. 9A-9B (and the other FIGS.) may be deemed to include any possible permutation.

The tape-based data storage system 900 is illustrated in FIGS. 9A-9B as having a tape library 902 which includes a plurality of cells 904. Although only three cells 904 are illustrated in FIGS. 9A-9B, the tape-based data storage system 900 may include any number of cells 904. As mentioned above, FIGS. 9A-9B are only partial representational diagrams of a given embodiment and are in no way intended to limit the invention. For example, tape-based data storage system 900 may include four, five, six, ten, fifteen, tens, dozens, fifty, one hundred, multiple, a plurality, etc., or any other number of cells depending on parameters such as: the size of the tape-based data storage system 900, a number of tape cartridges, a number of accessors available, controller limitations, user design, etc.

Referring still to FIGS. 9A-9B, each of the cells 904 are preferably able to store at least one tape cartridge therein, but any number of the cells 904 may be configured to store more than one tape cartridge therein, e.g., as shown above with reference to multi-cartridge deep slot cells 100. Accordingly, one or more tape cartridges 906 may be stored in each of the cells 904 as desired, e.g., depending on capacity of the cell; removal of, additions to, repositioning of, use of, etc. the tape cartridges 906 in the storage system 900; etc. Thus, a plurality of tape cartridges 906 may be stored in the cells 904 of the tape library 902 as a whole.

Looking to the cells 904 of FIGS. 9A-9B, the left-most cell only includes two tape cartridges 906 while the center and right-most cells are full, storing three tape cartridges each. It follows that the left-most cell has the capacity to store one additional tape cartridge while the center and right-most cells cannot, in this example. Moreover, depending on the size of the cells 904 and/or tape cartridges 906, more or fewer tape cartridges may be stored in a given cell. Again, the orientations, groupings, dimensions, etc. of the embodiment illustrated in FIGS. 9A-9B are in no way intended to limit the invention.

A wireless tag 908 is preferably coupled to each of the plurality of tape cartridges 906 in the storage system 900. The tag 908 may be an NFC tag using any suitable wireless technology that does not require direct line of sight. NFC technology is preferred because of its desirably short range, low power requirements, low cost, ability to use passive tags, etc. According to different approaches, the NFC tags 908 may be fixed to an outer surface of the tape cartridges 906 using an adhesive, implemented as part of a barcode affixed to a portion of the tape cartridges 906, integrated as part of the circuitry of the tape cartridge, embedded in a housing of the tape cartridge, etc. The NFC tags 908 may be configured to store at least one kilobyte (e.g., potentially multiple kilobytes) of information therein, e.g., by implementing an internal memory. Thus, the NFC tags 908 may store different information such as a unique label (identification) associated with the tag within the tape library, how often the tape associated with the tag is accessed, a type of data stored in the tape associated with the tag, the last time the tape associated with the tag was used, etc., depending on the desired embodiment. Moreover, one or more of the NFC tags 908 may be passive tags as would be appreciated by one skilled in the art.

Although it is preferred that a NFC tag 908 is coupled to each of the plurality of tape cartridges 906, tape cartridges 906 without NFC tags coupled thereto may be introduced to the tape library 902. As shown in the embodiment of FIGS. 9A-9B, as tape cartridges are removed, replaced, moved within a library, etc., tape cartridges 906 without a NFC tag 908 coupled thereto may be introduced to the tape library 902. Specific to the present embodiment, each of the tape cartridges 906 included in the left-most and center cells have a NFC tag 908 coupled thereto while the first tape cartridge (closest to the cell loading/unloading side 901) stored in the right-most cell has a tape cartridge 906 without a NFC tag 908 coupled thereto. It follows that tape cartridges 906 with and without a NFC tag 908 attached thereto are preferably accounted for accordingly during cataloging, as will be described in further detail below.

With continued reference to FIGS. 9A-9B, at least an antenna 910 of a near field communication device, e.g., an NFC-capable reader, an RFID reader 913, etc. may be positioned at each of the one or more cells 904. The antennas 910 and readers 913 may be of conventional construction, design and/or programming. In preferred embodiments, the reader 913 is an NFC reader that uses conventional NFC technology in which a passive tag is powered by the field emitted by the antenna. Chipless NFC technology may also be used, e.g., as where each tag has an antenna with a unique pattern and the unique pattern of the antenna creates a field or signal that is unique to the tag.

Continuing with the NFC example, in some embodiments a whole NFC reader 913 having an antenna 910 coupled thereto may be positioned at each of the one or more cells 904, while in other embodiments, less than a complete NFC reader having an antenna 910 coupled thereto, or only an antenna 910 itself may be positioned at some or all of the cells 904. Where the cell is constructed of a material that shields its contents, e.g., is RF reflective and/or absorptive, the antenna 910 may be positioned inside the cell, in an aperture in the cell, along an RF-transparent portion of the cell, etc.

According to one example, which is in no way intended to limit the invention, a unique NFC reader 913 may be positioned at each of the one or more cells 904. The NFC readers 913 may be electrically coupled to one or more central controllers (e.g., see 400 of FIG. 4), the one or more central controllers being able to gather, process, re-transmit, etc. information received from each of the NFC readers 913. However, according to another example, only an antenna 910 of an NFC reader may be positioned at each of the cells 904. In a further example, a single reader may be coupled to many antennas, the antennas being coupled to many cells. In such embodiment, the reader may perform reading and/or writing operations by selectively using each antenna to perform the desired operation at the cell associated with that antenna.

Moreover, the antennas 910 may communicate with one or more NFC readers positioned away from the cells 904, e.g., in a different part of the tape library 902. The NFC readers may also be electrically coupled to one or more central controllers (e.g., see 400 of FIG. 4) which are able to gather, process, re-transmit, etc. information received from each of the antennas 910 and/or NFC readers. Accordingly, NFC components may be implemented to quickly and efficiently determine an inventory of the tape-based data storage system 900, as will soon become apparent.

The NFC reader may be configured to read, and optionally encode, data on a NFC tag of a tape cartridge. Thus, new data may be encoded on the NFC tag and/or existing data may be modified by the NFC reader antenna, e.g., between catalogs of the tape library. Moreover, depending on the desired approach, the NFC reader antenna may be positioned on (e.g., coupled to) an accessor, a tape drive, an I/O station, at one or more (e.g., all) of the cells in a tape library, etc., or any other location in the tape-based data storage system which would be apparent to one skilled in the art upon reading the present description. It follows that new data may be encoded on the NFC tag and/or existing data of the NFC tag may be modified by the NFC reader antenna when a corresponding tape cartridge is being accessed (gripped) by the accessor, mounted in a tape drive, in the process of being inserted and/or removed from a tape library via an I/O station, etc.

With continued reference to FIGS. 9A-9B, each of the NFC reader antennas 910 may be positioned relative to the associated cell 904 to be in direct communication with the NFC tag 908 coupled to the tape cartridge 906 stored in the associated cell 904. As mentioned above, NFC devices typically operate in a high frequency range and have signal strengths which typically limit an achievable communication range between NFC devices (e.g., a NFC tag and NFC reader). The communication range achievable between two NFC devices may vary depending on a supply voltage, antenna construction, antenna orientation, signal strength, power output of an antenna, shielding, etc. Where the tags are passive tags, each antenna 910 is preferably positioned relative to the associated cell 904 such that a distance between an antenna 910 and a NFC tag 908 on a tape cartridge 906 in the cell 904 is not greater than 8 inches, more preferably not greater than 4 inches, but could be higher or lower depending on the desired embodiment. According to an ideal implementation, the antennas 910 may be coupled to a sidewall of the associated cells 904, e.g., preferably at about a center of the cell sidewall to facilitate communication with a tape cartridge 906 at any position within the cell 904, while minimizing reading of tags in an adjacent cell.

An exemplary range 911 of one of the antennas 910 is illustrated in FIG. 9A in accordance with one embodiment, which is in no way intended to limit the invention. It should be noted that although range 911 and other ranges described herein are represented as being two dimensional in each of the planes of view of the FIGS., one skilled in the art would appreciate that the ranges are actually three dimensional spheres in application. This spherical attribute is partially apparent when range 911 is examined in the orthogonal planes of view in FIGS. 9A-9B.

Each of the antennas 910 may be able to detect and/or communicate with any NFC tag 908 positioned in a respective range 911 of the antennas 910. Ideally, the NFC reader antenna 910 is only in range with tags in a single cell. This result may be achieved by using a directional antenna, e.g., a patch antenna; RF or other shielding, e.g., between cells; selecting antenna power to limit range; etc. Accordingly, any tag read would then be known to be in that particular cell. Known anticollision protocols may be used to enable the NFC reader to communicate sequentially with each tag in range.

However, as shown, range 911 may extend such that it includes NFC tags 908 of the cell 904 corresponding to the particular antenna 910, and potentially NFC tags 908 of adjacent cells 904. Looking to FIG. 9B, the antenna 910 corresponding to an adjacent cell 904 is depicted as having a similar range 912. Portions of exemplary ranges 911, 912 may overlap. Thus, an antenna 910 may detect and/or communicate with NFC tags 908 from more than one cell 904. It follows that more than one antenna 910 may detect and/or communicate with a given NFC tag 908, e.g., depending on overlapping antenna ranges.

To avoid redundancy and ensure an accurate inventory of the tape library 902, NFC tags detected by more than one antenna 910 are preferably deduplicated. According to one approach, an NFC tag detected by more than one antenna 910 may be deduplicated by reading information (e.g., metadata) stored on the NFC tag or in system memory. For example, where readers from two different cells detect the same tag, a last known location of the cartridge matching one of the cells may be assumed to be the cell holding the cartridge. According to another approach, an NFC tag detected by more than one antenna 910 may be deduplicated by analyzing the strength of a signal received from the NFC tag at each of the antennas which detected the NFC tag. Although not always the case, it may be determined that the NFC tag corresponds to the cell associated with the antenna receiving the strongest signal. Once a corresponding antenna has been determined for the redundantly detected NFC tag, the tag and/or cartridge coupled thereto may be associated with the cell.

Figure 9C:
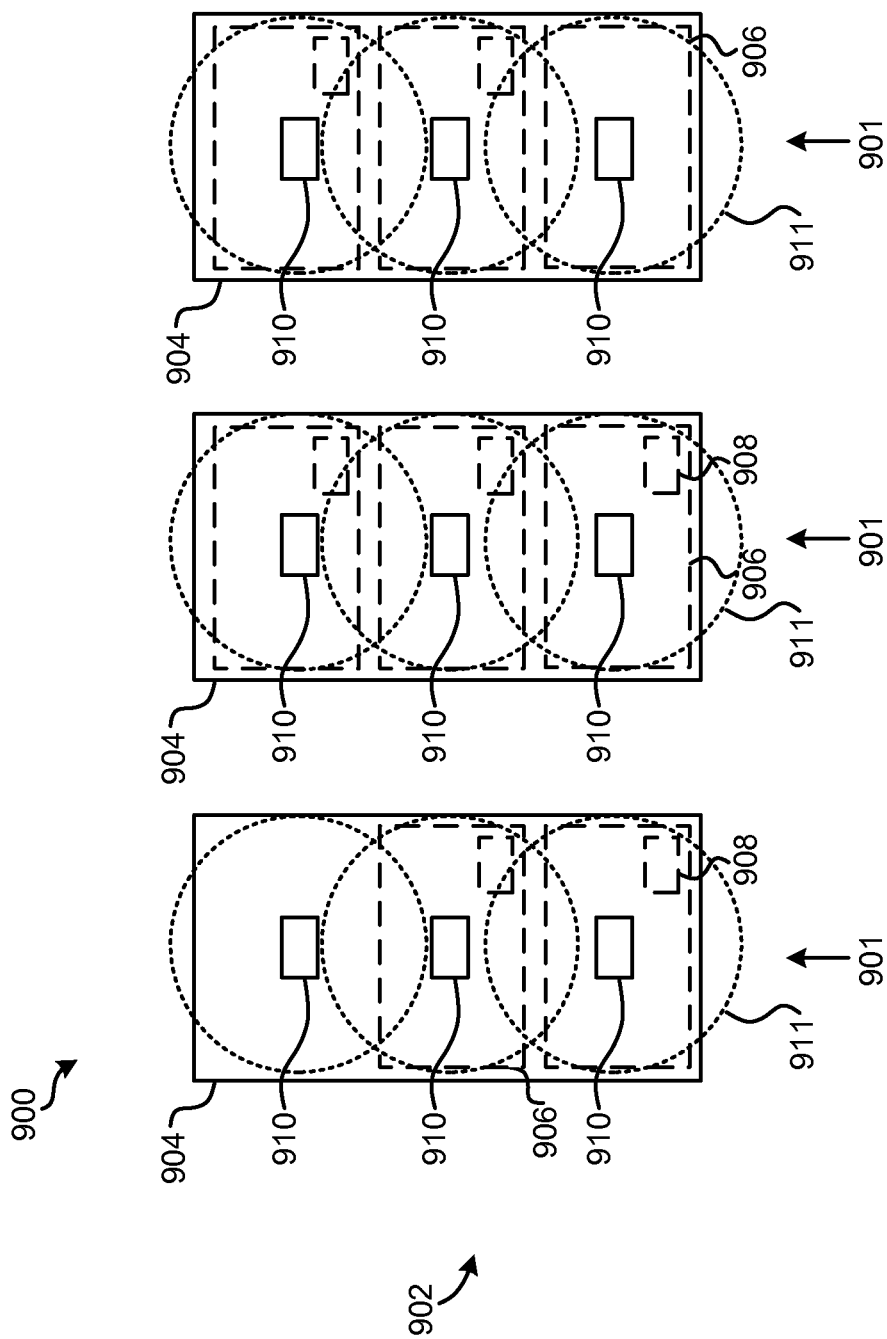
FIG. 9C is a partial representational diagram of the tape-based data storage system of FIG. 9A according to one embodiment.

Again, exemplary ranges 911, 912 of two of the antennas 910 are depicted in FIGS. 9A-9B in accordance with one embodiment, which is in no way intended to limit the invention. As mentioned above, the effective range of an antenna may be chosen such that it only encompasses the NFC tags in a corresponding cell. For example, looking to FIG. 9C, several antennas are provide for each cell, but the ranges 911 of the antennas 910 are chosen such that, although they may overlap, each range 911 only includes the NFC tags included in a corresponding cell 904. Thus, each of the antennas 910 may be able to detect and/or communicate with any NFC tag 908 positioned in the respective range 911 without detecting NFC tags 908 in adjacent cells. Moreover, where the range 911 is small enough, the position of the cartridge within the cell may also be obtained by correlating the tag with the position of the antenna reading the tag.

An effective range of the various antennas 910 may be set, limited and/or changed over time in view of various parameters such as a number of NFC tags in a corresponding cell, dimensions and/or positioning of the cells, a distance between an antenna and a furthest NFC tag in a corresponding cell, etc., depending on the desired embodiment.

Referring again to FIGS. 9A-9B, the reader(s) associated with the antennas 910 may convey information pertaining to the corresponding cells 904, as well as the tape cartridges 906 and/or NFC tags 908 stored therein, to a central controller. The controller may be a part of the library and/or part of a host coupled to the library. It follows that the central controller (e.g., see 400 of FIG. 4) may be common to multiple, or in some cases all, antennas 910. Moreover, depending on the desired embodiment, the central controllers may be able to perform any one or more of the operations described below with reference to method 1000 of FIG. 10.

Figure 10:
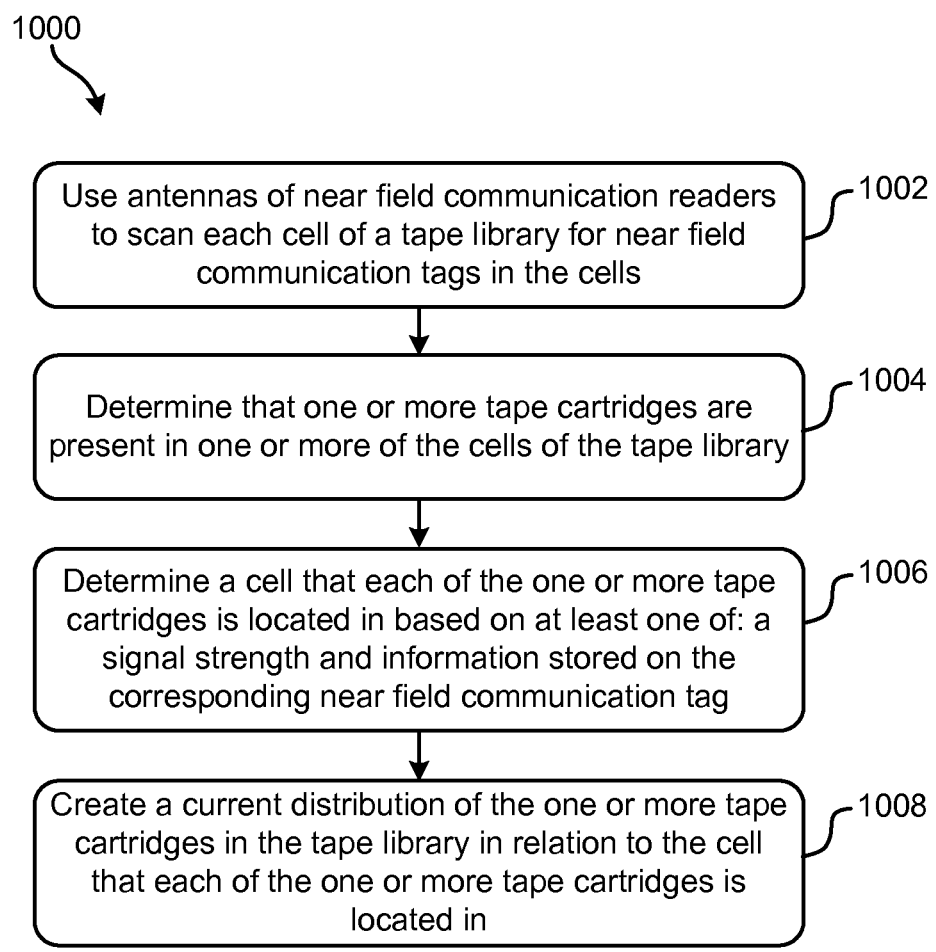
FIG. 10 is a flowchart of a method according to one embodiment.

Now referring to FIG. 10, a flowchart of a method 1000 is shown according to one embodiment. The method 1000 may be performed in accordance with the present invention in any of the environments depicted in FIGS. 1-9B, among others, in various embodiments. Of course, more or less operations than those specifically described in FIG. 10 may be included in method 1000, as would be understood by one of skill in the art upon reading the present descriptions.

Each of the steps of the method 1000 may be performed by any suitable component of the operating environment. For example, in various embodiments, the method 1000 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 1000. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 10, method 1000 includes operation 1002, where at least one NFC reader is used to scan each cell of a tape library for NFC tags in the cell. As described above, NFC readers (or at least antennas thereof) may be used to scan cells of the tape library for NFC tags in the cells.

Moreover, operation 1004 includes determining that one or more tape cartridges are present in one or more of the cells of the tape library in response to detecting one or more of the NFC tags in the one or more cells.

However, as mentioned above, a given NFC tag may be detected by more than one NFC reader. Thus, NFC tags that are detected by more than one NFC reader are preferably deduplicated, e.g., by first determining a cell that the NFC tags correspond to. Referring still to method 1000, operation 1006 includes determining a cell that each of the one or more tape cartridges determined in operation 1004 is located in, based on at least one of: a signal strength and information (e.g., metadata) stored on the corresponding near field communication tag.

Furthermore, a current distribution of the one or more tape cartridges in the tape library may be created in relation to the cells that each of the tape cartridges are located in. See operation 1008. Such distribution may be in the form of a table or other type of data structure associating each tag and/or cartridge with a particular cell. As mentioned above, by determining which cell each of the detected NFC tags (and therefore the tape cartridges) are located in, an accurate mapping of how the NFC tags, and the corresponding tape cartridges, are distributed in a given tape library may be determined.

Again, although it is preferred that a NFC tag is coupled to each of the plurality of tape cartridges in a tape library, tape cartridges without NFC tags coupled thereto may be introduced to the tape library as tape cartridges are removed, replaced, moved within a library, etc. Although the location of tape cartridges not having an NFC tag coupled thereto may be stored in memory (e.g., a lookup table) and updated over time as such tape cartridges are removed, replaced, moved by components within a library, etc., some events may not be detected by the tape library. For example, a user may open the tape library and physically rearrange, insert, remove, etc. tape cartridges while the tape library is powered off. Thus, a current distribution generated using only NFC devices may not be a complete description of what is actually distributed within a tape library. It follows that tape cartridges not having a NFC tag attached thereto are preferably accounted for in addition to those tape cartridges having a NFC tag attached thereto.

Figure 11:
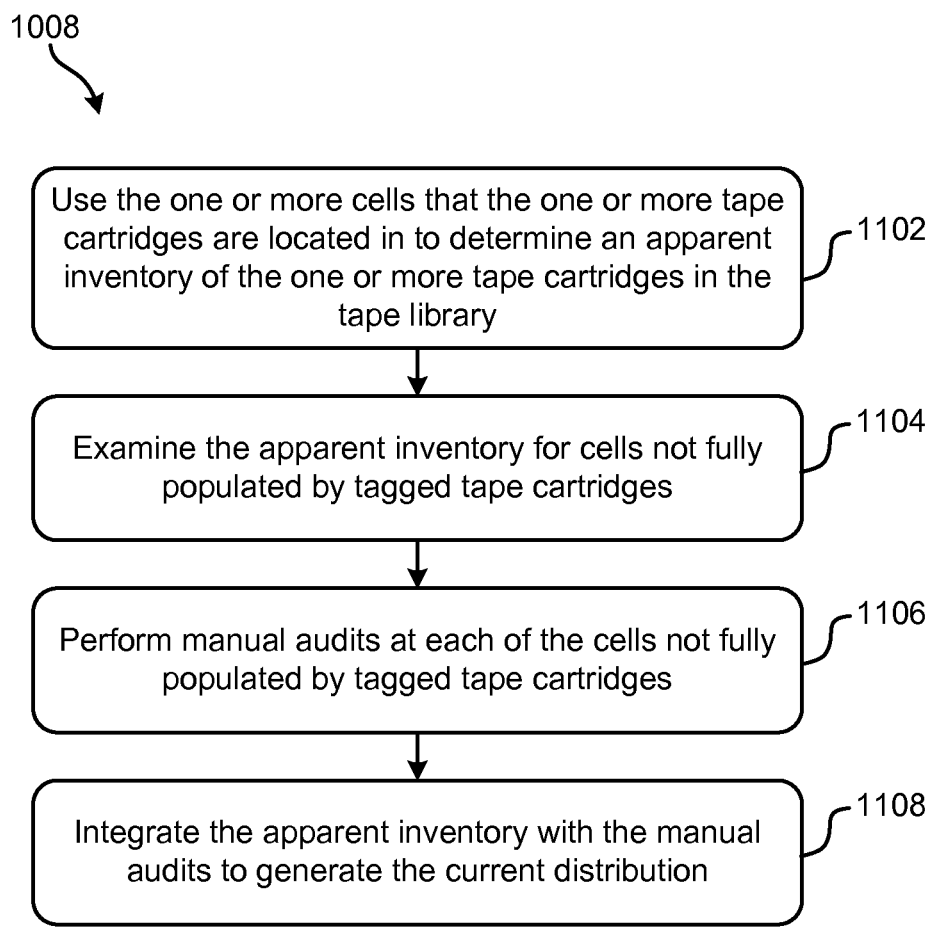
FIG. 11 is a flowchart of sub-processes of the method in FIG. 10.

Looking to FIG. 11, a flowchart of sub-processes which may be used to create a current distribution as seen in operation 1008 above, are illustrated in accordance with one embodiment, which is in no way intended to limit the invention. As shown, operation 1008 may include using the one or more cells that the one or more tape cartridges are located in to determine an apparent inventory of the one or more tape cartridges in the tape library. See sub-process 1102.

Moreover, the apparent inventory may be examined for cells not fully populated by tagged tape cartridges, as seen in sub-process 1104. Again, an apparent inventory of a tape library may not be an accurate indication of the actual inventory thereof. Particularly, as tape cartridges are added to and/or removed from a tape library, tape cartridges without NFC tags coupled thereto may be introduced to the tape library. Moreover, as tape cartridges are repositioned within the tape library, e.g., as they are accessed, it is difficult to maintain an accurate mapping of those tape cartridges without NFC tags coupled thereto, particularly among a plurality of tape cartridges having NFC tags coupled thereto.

While a cell may appear to only include tape cartridges having NFC tags coupled thereto, tape cartridges without NFC tags coupled thereto are not detected by NFC readers. Thus, unless a cell is fully populated by tape cartridges having NFC tags coupled thereto, it is possible that an apparently empty slot in the cell has an untagged cartridge therein, even though a scan operation reveals the same cell population as that stored by the library. Moreover, the library data files indicate that an untagged cartridge is present in the system, and may refer to a cell expected to have the untagged cartridge. Therefore, it may be desirable to manually check the contents of any cells having apparently empty slots and/or untagged cartridges.

It follows that examining the apparent inventory for cells not fully populated by tagged tape cartridges is desirable to prevent overlooking the presence or absence of a tape cartridge that cannot be detected by a NFC reader, and/or to verify the location of any known untagged cartridges. Thus, manual audits may be performed as part of creating a current distribution of a tape library. However, it is undesirable that manual audits are performed at every cell of the tape library, as doing so would revert cataloging run times back to the order of several hours, as experienced in previous inventory attempts.

Accordingly, sub-process 1106 includes performing manual audits at each cell not fully populated by tagged tape cartridges, and/or at those cells having a discrepancy between the apparent inventory and an expected (previously-stored) distribution. According to one approach, performing a manual audit may include physically inspecting each tape cartridge in each of the cells not fully populated by tagged tape cartridges. It should be noted that manual audits are also preferably performed on cells that are considered empty. Again, cells which appear to be empty may actually include tape cartridges without NFC tags coupled thereto and/or which were not detected by a NFC reader.

According to an example, a manual audit may include an accessor, according to any of the approaches described herein (e.g., see 18, 28 of FIG. 3), selectively removing and examining each cartridge from the cell being physically inspected. A cartridge may be examined by scanning a barcode coupled to the tape cartridge, reading cartridge memory, reading a portion of the tape stored in the tape cartridge, etc., preferably to determine information which may be used to identify the specific tape cartridge. Thus, some of the embodiments herein may include a barcode reader, or other line of sight devices, to scan barcodes coupled to tape cartridges in the event that a manual audit is desired.

Conversely, an accessor may be instructed to skip over (ignore) cells determined to be fully populated with tagged tape cartridges during a manual audit. Other situations may also result in having a particular cell skipped over during a manual audit of the cells in a tape library. For example, cells determined to have the same first tape cartridge stored therein (e.g., in a frontmost tier 621 of FIG. 7A) may be assumed to have the same arrangement of tape cartridges therein as when the last distribution of the tape library was created, and may accordingly be skipped over during a manual audit. In such instances, it may be assumed that having a same first tape cartridge in a cell as when the last distribution of the tape library was created is an indication that the tape cartridges included in that cell were not altered. In another approach, where the cell has an integrated physical cartridge detection mechanism that indicates which slots have cartridges and which do not, without reliance on the tags, if the number of occupied slots in the cell matches the number of tags identified, then the cell can be skipped over.

With continued reference to FIG. 11, sub-process 1108 includes integrating the apparent inventory with the manual audits to generate the current distribution of the tape library.

As embodiments described herein are used, components may wear out over time. Although dead NFC tags may be accounted for by performing the manual audits as described above, dead NFC readers (e.g., the antennas of NFC readers) may pose a problem if they are not detected and replaced in a timely manner. One or more dead NFC readers will result in one or more cells of a tape library not being scanned when creating a current distribution thereof. Therefore, it is desirable that dead NFC readers may be detected. According to various approaches, a dead NFC reader may be detected by analyzing NFC reader antenna range overlap (e.g., see 911, 912 of FIG. 9), performing diagnostics of the tape library, comparing distribution results with an expected distribution (e.g., based on a previous distribution), etc. Any one or more of these approaches may be implemented by a controller of the tape library upon detecting predetermined conditions, automatically, etc.; by a user; periodically; etc.

As mentioned above, some of the embodiments described herein may be able to improve tape library cataloging by introducing NFC components which are able to greatly reduce the amount of time required to determine the current distribution of a given tape library. By implementing some of the embodiments described and/or suggested herein, the current distribution of a given tape library may be generated in less than about one minute from when a scan of each cell of the tape library is initiated (e.g., see operation 1002 above), but could be shorter or longer based on a size of the tape library, a number of NFC tags included in the tape library, an amount of available processing power, etc. It follows that a current distribution of a tape library may be generated in much less time than previously achievable, e.g., greater than 90% less time. As described throughout, by implementing NFC components according to any of the embodiments herein, efficiency of tape library cataloging is improved. In view of the short amount of time that a distribution may be generated, inventories of a given tape library may be performed as often as desired, e.g., periodically, upon request, after a certain number of tape cartridges have been added and/or removed from the tape library, etc. Furthermore, some of the embodiments described herein may be used for data mining; determining cartridge attributes, e.g., such as utilization, most recent usage, encryption, etc; etc., as would be appreciated by one skilled in the art upon reading the present description.

Figure 12:
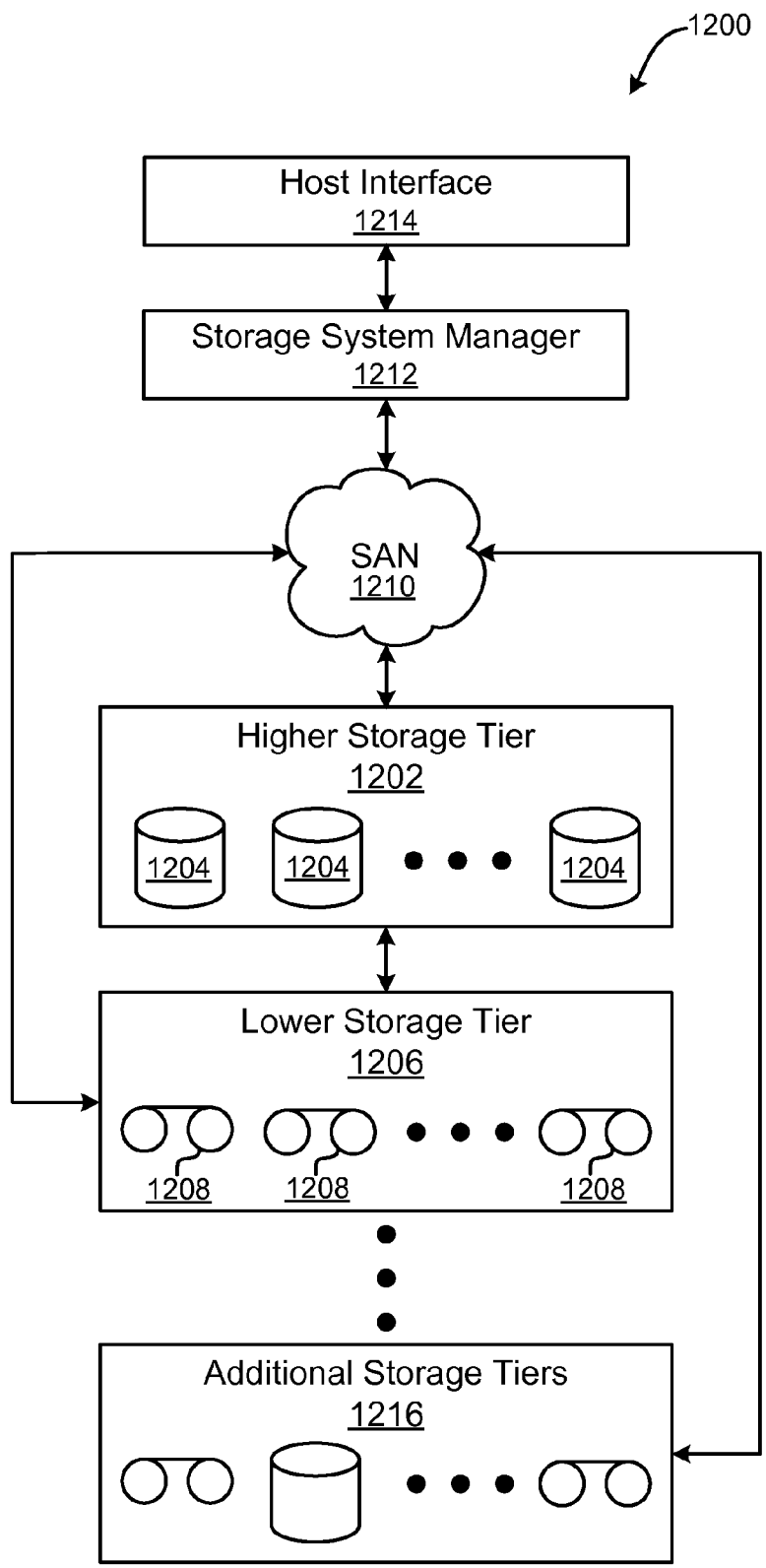
FIG. 12 is a tiered data storage system according to one embodiment.

Now referring to FIG. 12, a storage system 1200 is shown according to one embodiment. Note that some of the elements shown in FIG. 12 may be implemented as hardware and/or software, according to various embodiments. In some approaches, the storage system 1200 may be implemented in an automated data storage library such as that shown in FIGS. 1-2. In other approaches, an automated data storage library such as that shown in FIGS. 1-2 may be a tier of the storage system 1200.

The storage system 1200 may include a storage system manager 1212 for communicating with a plurality of media on at least one higher storage tier 1202 and at least one lower storage tier 1206. The higher storage tier(s) 1202 preferably may include one or more random access and/or direct access media 1204, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 1206 may preferably include one or more lower performing storage media 1208, including sequential access media such as magnetic tape in tape drives and/or optical media, slower accessing HDDs, slower accessing SSDs, etc., and/or others noted herein or known in the art. One or more additional storage tiers 1216 may include any combination of storage memory media as desired by a designer of the system 1200. Also, any of the higher storage tiers 1202 and/or the lower storage tiers 1206 may include some combination of storage devices and/or storage media.

The storage system manager 1212 may communicate with the storage media 1204, 1208 on the higher storage tier(s) 1202 and lower storage tier(s) 1206 through a network 1210, such as a storage area network (SAN), as shown in FIG. 12, or some other suitable network type. The storage system manager 1212 may also communicate with one or more host systems (not shown) through a host interface 1214, which may or may not be a part of the storage system manager 1212. The storage system manager 1212 and/or any other component of the storage system 1200 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 1200 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 1202, may include a majority of SSD storage media for storing data in a higher performing storage environment, and remaining storage tiers, including lower storage tier 1206 and additional storage tiers 1216 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 1202, while data not having one of these attributes may be stored to the additional storage tiers 1216, including lower storage tier 1206. Of course, one of skill in the art, upon reading the present descriptions, may devise many other combinations of storage media types to implement into different storage schemes, according to the embodiments presented herein.

According to some embodiments, the storage system (such as 1200) may include logic configured to receive a request to open a data set, logic configured to determine if the requested data set is stored to a lower storage tier 1206 of a tiered data storage system 1200 in multiple associated portions, logic configured to move each associated portion of the requested data set to a higher storage tier 1202 of the tiered data storage system 1200, and logic configured to assemble the requested data set on the higher storage tier 1202 of the tiered data storage system 1200 from the associated portions. Of course, this logic may be implemented as a method on any device and/or system or as a computer program product, according to various embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

A data processing system suitable for storing and/or executing program code may include at least one processor, which may be or be part of a controller, coupled directly or indirectly to memory elements through a system bus, such as processor 400 of FIG. 4. The memory elements can include local memory employed during actual execution of the program code, such as nonvolatile memory 404 of FIG. 4, bulk storage, and cache memories which provide temporary storage of at least some program code in order to reduce the number of times code must be retrieved from bulk storage during execution.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A tape-based data storage system, comprising:
   a tape library, comprising:
   a plurality of cells, each of the cells being configured to store two or more tape cartridges therein;
   one antenna of a near field communication reader positioned at each of the cells,
   wherein each of the antennas are positioned relative the associated cell to be in direct communication with a near field communication tag coupled to a tape cartridge stored in the associated cell; and
   a controller and logic integrated with and/or executable by the controller, the logic being configured to:
   use at least one near field communication reader to scan each cell of a tape library for near field communication tags in the cells;
   determine that one or more tape cartridges are present in one or more of the cells of the tape library in response to detecting one or more of the near field communication tags in the cells;
   determine a cell that each of the one or more tape cartridges is located in based on at least one of: a signal strength and information stored on the corresponding near field communication tag;
   create a current distribution of the one or more tape cartridges in the tape library in relation to the cell that each of the one or more tape cartridges is located in; and
   determine whether an error has occurred in any of the near field communication readers by analyzing an overlap in the range of the antennas of near field communication readers.

2. A tape-based data storage system as recited in claim 1, comprising an accessor having at least an antenna of a near field communication device configured to encode data on a near field communication tag of a tape cartridge being transported by the accessor.

3. A tape-based data storage system as recited in claim 1, comprising a tape drive having at least an antenna of a near field communication device configured to encode data on a near field communication tag of a tape cartridge at the tape drive.

4. A tape-based data storage system as recited in claim 1, comprising:
   a plurality of tape cartridges stored in the cells; and
   a near field communication tag coupled to each of the plurality of tape cartridges,
   wherein only one antenna of a near field communication reader is positioned at each of the cells,
   wherein each of the antennas is configured to be in direct communication with each of the near field communication tags coupled to the tape cartridges stored in the associated cell.

5. A tape-based data storage system as recited in claim 4, wherein the near field communication tags are configured to store at least one kilobyte of information.

6. A tape-based data storage system as recited in claim 4, wherein the near field communication tags are passive tags.

7. A tape-based data storage system as recited in claim 1, wherein each antenna is positioned relative to the associated cell such that a distance between the antenna and a near field communication tag on a tape cartridge in the cell is not greater than 4 inches.

8. A tape-based data storage system, comprising:
   a tape library, comprising:
   a plurality of cells, each of the cells being configured to store one or more tape cartridges therein;
   a near field communication reader positioned at each of the cells,
   wherein each of the near field communication readers are positioned relative the associated cell to be in direct communication with a near field communication tag coupled to a tape cartridge stored in the associated cell; and
   a controller and logic integrated with and/or executable by the controller, the logic being configured to:
   use at least one of the near field communication readers to scan each cell of a tape library for near field communication tags in the cells;
   determine that one or more tape cartridges are present in one or more of the cells of the tape library in response to detecting one or more of the near field communication tags in the cells;
   determine a cell that each of the one or more tape cartridges is located in based on at least one of: a signal strength and information stored on the corresponding near field communication tag;
   create a current distribution of the one or more tape cartridges in the tape library in relation to the cell that each of the one or more tape cartridges is located in; and determine whether an error has occurred in any of the near field communication readers by analyzing an overlap in the range of an antenna of each of the respective near field communication readers.

9. A tape-based data storage system as recited in claim 8, wherein the near field communication readers are configured to read and encode data on the near field communication tags coupled to the tape cartridges stored in the associated cells.

10. A tape-based data storage system as recited in claim 8, wherein each antenna is positioned relative to the associated cell such that a distance between the antenna and a near field communication tag on a tape cartridge in the cell is not greater than 4 inches.

11. A computer-implemented method, comprising:
using at least an antenna of near field communication readers to scan each cell of a tape library for near field communication tags in the cells;
determining that one or more tape cartridges are present in one or more of the cells of the tape library in response to detecting one or more of the near field communication tags in the cells;
determining a cell that each of the one or more tape cartridges is located in based on at least one of: a signal strength and information (e.g., metadata) stored on the corresponding near field communication tag;
determining whether any two or more of the detected one or more of the near field communication tags are the same near field communication tag;
deduplicating the near field communication tags in response to determining that any two or more of the detected one or more of the near field communication tags are the same near field communication tag; and
creating a current distribution of the one or more tape cartridges in the tape library in relation to the cell that each of the one or more tape cartridges is located in.

12. A method as recited in claim 11, wherein creating the current distribution includes:
using the cells that the one or more tape cartridges are located in to determine an apparent inventory of the one or more tape cartridges in the tape library;
examining the apparent inventory for cells not fully populated by tape cartridges which correspond to near field communication tags;
performing manual audits at each of the cells not fully populated by tape cartridges which correspond to near field communication tags and not having the same first tape cartridge stored therein as when a last distribution was created; and
integrating the apparent inventory with the manual audits to generate the current distribution.

13. A method as recited in claim 12, wherein performing the manual audits include:
physically inspecting each tape cartridge in each of the cells not fully populated by tape cartridges which correspond to near field communication tags and not having the same first tape cartridge stored therein as when a last distribution was created.

14. A method as recited in claim 11, wherein the current distribution of the one or more tape cartridges in the tape library is generated in less than one minute from when the scanning is initiated.

15. A method as recited in claim 11, comprising:
determining whether an error has occurred in any of the near field communication readers by analyzing an overlap in the range of the antennas of near field communication readers,
wherein the tape library includes a near field communication device configured to encode data on the near field communication tags.

16. A method as recited in claim 11, wherein each antenna is positioned relative to the associated cell such that a distance between the antenna and a near field communication tag on a tape cartridge in the cell is not greater than 4 inches.

17. A method as recited in claim 11, comprising comparing the apparent inventory with an expected distribution, and performing manual audits of each cell having a discrepancy between the apparent inventory and the expected distribution.

18. A computer program product, the computer program product comprising a computer readable storage medium having program instructions embodied therewith, wherein the computer readable storage medium is not a transitory signal per se, the program instructions readable and/or executable by a controller to cause the controller to perform a method comprising:
using, by the controller, at least one near field communication reader to scan each cell of a tape library for near field communication tags in the cells;
determining, by the controller, that one or more tape cartridges are present in one or more of the cells of the tape library in response to detecting one or more of the near field communication tags in the cells;
determining, by the controller, a cell that each of the one or more tape cartridges is located in based on at least one of: a signal strength and information (e.g., metadata) stored on the corresponding near field communication tag;
determining, by the controller, whether any two or more of the detected one or more of the near field communication tags are the same near field communication tag;
deduplicating, by the controller, the near field communication tags in response to determining that any two or more of the detected one or more of the near field communication tags are the same near field communication tag; and
creating, by the controller, a current distribution of the one or more tape cartridges in the tape library in relation to the cell that each of the one or more tape cartridges is located in.

19. A computer program product as recited in claim 18, wherein creating the current distribution includes:
using the cells that the one or more tape cartridges are located in to determine an apparent inventory of the one or more tape cartridges in the tape library;
examining the apparent inventory for cells not fully populated by tape cartridges which correspond to near field communication tags;
performing manual audits at each of the cells not fully populated by tape cartridges which correspond to near field communication tags and not having the same first tape cartridge stored therein as when a last distribution was created; and
integrating the apparent inventory with the manual audits to generate the current distribution.

20. A computer program product as recited in claim 19, wherein performing the manual audits include:
physically inspecting each tape cartridge in each of the cells not fully populated by tape cartridges which correspond to near field communication tags and not having the same first tape cartridge stored therein as when a last distribution was created.

21. A computer program product as recited in claim 18, wherein the current distribution of the one or more tape cartridges in the tape library is generated in less than one minute from when the scanning is initiated.

22. A computer program product as recited in claim 18, wherein the at least one near field communication reader is configured to read and encode data on the near field communication tags.

23. A computer program product as recited in claim 18, wherein each antenna is positioned relative to the associated cell such that a distance between the antenna and a near field communication tag on a tape cartridge in the cell is not greater than 4 inches, wherein the tape library includes an accessor having a near field communication reader configured to read and encode data on a near field communication tag of a tape cartridge being transported by the accessor, wherein the tape library includes a tape drive having a near field communication reader configured to read and encode data on a near field communication tag of a tape cartridge at the tape drive, wherein the near field communication tags are configured to store at least one kilobyte of information, wherein the current distribution of the one or more tape cartridges in the tape library is generated in less than one minute from when the scanning is initiated.

24. A computer program product as recited in claim 18, comprising program instructions readable and/or executable by a controller to cause the controller to compare the apparent inventory with an expected distribution, and perform manual audits of each cell having a discrepancy between the apparent inventory and the expected distribution.

* * * * *